US012491871B1

(12) United States Patent
Zhang et al.

(10) Patent No.: US 12,491,871 B1
(45) Date of Patent: Dec. 9, 2025

(54) PARALLEL PROCESSING FILTER FOR DETECTING OBJECT RELEVANCE TO VEHICLE OPERATION PLANNING

(71) Applicant: Zoox, Inc., Foster City, CA (US)

(72) Inventors: Linjun Zhang, Foster City, CA (US); Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 205 days.

(21) Appl. No.: 18/375,292

(22) Filed: Sep. 29, 2023

(51) Int. Cl.
| | |
|---|---|
| B60W 30/09 | (2012.01) |
| B60W 30/095 | (2012.01) |
| B60W 40/105 | (2012.01) |
| B60W 40/107 | (2012.01) |
| B60W 50/00 | (2006.01) |
| B60W 60/00 | (2020.01) |

(52) U.S. Cl.
CPC ........ B60W 30/09 (2013.01); B60W 30/0956 (2013.01); B60W 40/105 (2013.01); B60W 40/107 (2013.01); B60W 50/0097 (2013.01); B60W 60/0015 (2020.02); B60W 60/00274 (2020.02); B60W 2050/0031 (2013.01); B60W 2554/4045 (2020.02); B60W 2554/80 (2020.02)

(58) Field of Classification Search
CPC ............. B60W 30/09; B60W 30/0956; B60W 60/0015; B60W 60/00274; B60W 40/105; B60W 40/107; B60W 50/0097
See application file for complete search history.

(56) References Cited

U.S. PATENT DOCUMENTS

| | | | |
|---|---|---|---|
| 10,649,459 | B2 | 5/2020 | Wang |
| 11,392,128 | B1 | 7/2022 | Ma |
| 11,577,741 | B1 | 2/2023 | Reschka |
| 2020/0086861 | A1 | 3/2020 | McGill, Jr. et al. |
| 2021/0231441 | A1 | 7/2021 | Fortmann |

(Continued)

OTHER PUBLICATIONS

Office Action for U.S. Appl. No. 18/375,360, Dated May 28, 2025, Kobilarov,"Computation Conserving Filter for Detecting Object Relevance and Priority to Vehicle Operation Planning ," 10 pages.

(Continued)

*Primary Examiner* — Wade Miles
*Assistant Examiner* — Zachary Joseph Wallace
(74) *Attorney, Agent, or Firm* — Lee & Hayes, P.C.

(57) ABSTRACT

A relevance filter may determine to use additional computing resources to generate predicted trajectory(ies) for a subset object(s) detected by a vehicle that depend on a candidate action for controlling the vehicle. The relevance filter may determine the subset by a memory storage and parallel computing technique that includes determining a set of vehicle states associated with a path for controlling the vehicle; determining a set of object states associated with a predicted trajectory of an object; determining a set of interaction scores based on the set of vehicle states and the set of object states; determining, based on the set of interaction scores, a trajectory importance score associated with the predicted trajectory; determining, based on the trajectory importance score, an object importance score associated with the object; and controlling the vehicle based at least in part on the object importance score and/or a new predicted trajectory for the object.

20 Claims, 10 Drawing Sheets

(56) References Cited

U.S. PATENT DOCUMENTS

| | | |
|---|---|---|
| 2021/0253131 A1 | 8/2021 | Abhishek et al. |
| 2023/0196784 A1* | 6/2023 | Winter .................. G06V 10/764 701/24 |

OTHER PUBLICATIONS

U.S. Appl. No. 16/779,576, filed Jan. 31, 2020.
U.S. Appl. No. 17/133,306, filed Dec. 23, 2020.
U.S. Appl. No. 18/217,138, filed Jun. 30, 2023.

* cited by examiner

PARALLEL PROCESSING FILTER FOR DETECTING OBJECT RELEVANCE TO VEHICLE OPERATION PLANNING

BACKGROUND

In dense urban environments and other scenarios, the number of objects, both moving and stationary, that an autonomous vehicle detects may be high. The number of objects detected may directly affect the amount of computational resources the autonomous vehicle uses (e.g., for tracking objects). However, not every object in an environment may be relevant to how the autonomous vehicle is operated, and identifying which objects are relevant to the autonomous vehicle's operations is non-trivial without human guidance.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
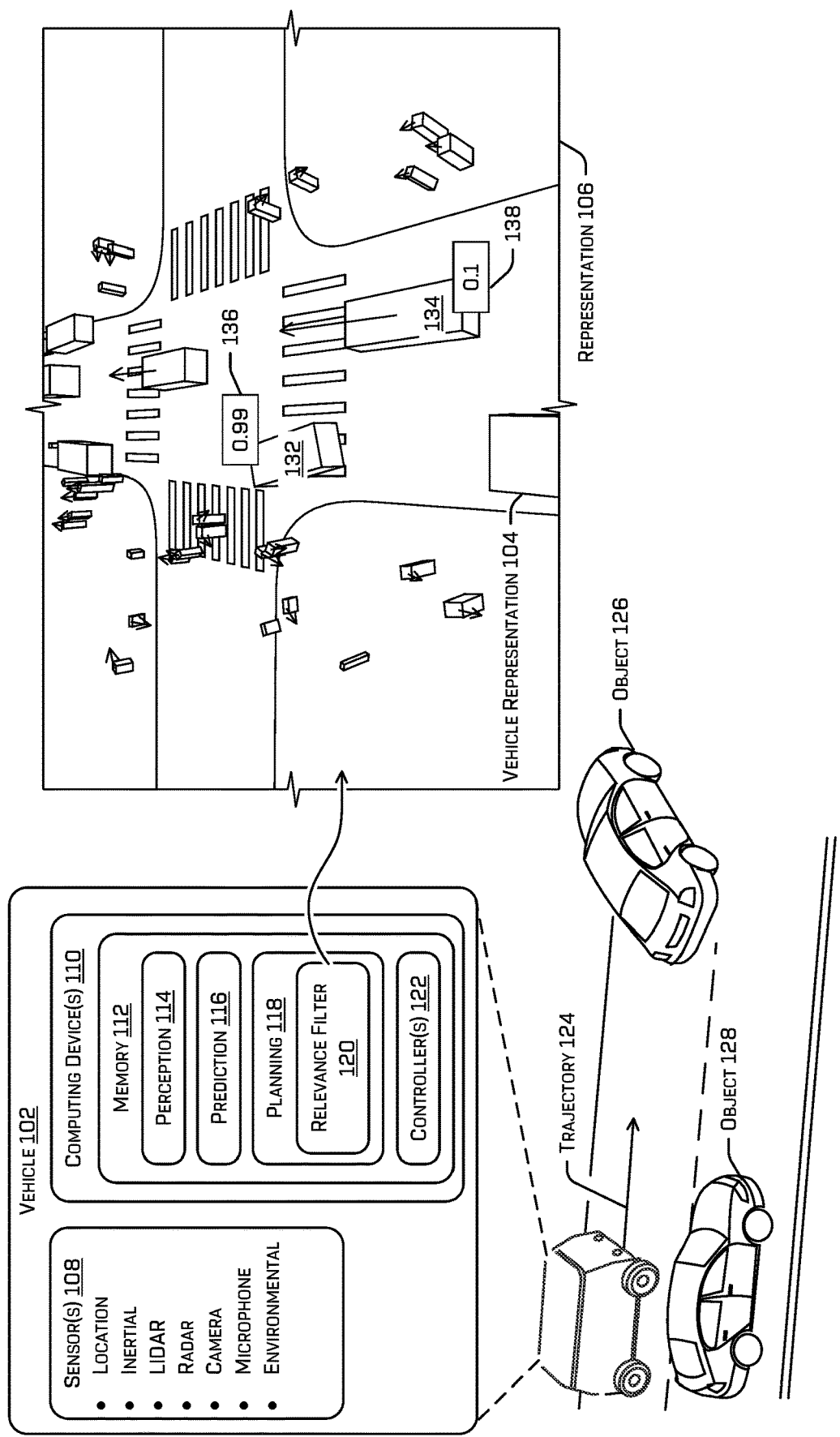
FIG. 1 illustrates an autonomous vehicle and an example scenario depicting functionality of the relevance filter discussed herein.

As discussed above, the number of objects detected by a vehicle may affect the computational complexity of detecting, tracking, or otherwise processing these objects, which may increase computation time/latency, memory used, and decrease available processing hardware for other tasks. This may be problematic since the portion of a vehicle's computational resources devoted to tracking objects and/or predicting their future movements, for example, may only be a portion of the vehicle's total computational resources. Moreover, since some objects may not be relevant to a vehicle's operations, such as by heading a different direction from the vehicle or a path of the vehicle or lacking an intent to move in such a manner, a portion of the computational resources used for tracking such objects may unnecessarily complicate the computations the vehicle uses to plan next actions by the vehicle. In total, this ends up increasing the time and/or computations required to plan a next action for the vehicle and may even be computationally prohibitive. Ultimately, in some such examples, this may lead to an unsafe situation where the vehicle is unable to react to situations in real-time.

The techniques (e.g., hardware and/or software) discussed herein may comprise an architecture for determining a relevance of an object to a next action of a vehicle. The techniques may include determining to classify objects detected by the vehicle as being either "active objects" or "inactive objects." An "active object" may be an object that is sufficiently likely (as determined by the techniques discussed herein) to affect or be affected by the vehicle's operational planning, whereas "inactive objects" are determined to not be likely to affect or be affected by the vehicle's operational planning. For example, to classify an object as an active object, the techniques may include determining that motion of an active object is determined to be based at least in part on a candidate trajectory for controlling the vehicle and/or controlling the vehicle is based at least in part on the motion of the active object. Whereas, classifying an object as an inactive object may be based at least in part on determining that motion of an inactive object is estimated to be independent of the candidate trajectory for controlling the vehicle. The vehicle may use this classification to differently predict an object's future action based on the classification. For example, the vehicle may determine a passive prediction for up to all detected objects within a threshold distance of the vehicle. This passive prediction may be computationally light, such as by using a simple kinematic model of movement to determine the passive prediction for an object. Such a kinematic model may use a track associated with the object that indicates a current and/or historical position, orientation, velocity, acceleration, object classification (e.g., pedestrian, vehicle, signage, construction site, cyclist), object state (e.g., green light, red light, door open, passenger loading/unloading), and/or other characteristic of the object to determine, via kinematics, a predicted trajectory of the object, which may include a future position, orientation, velocity, acceleration, and/or object state of the object. This passive predicted trajectory may be used by a planning component of the vehicle for objects not classified as active objects.

For an object classified as an active object according to the techniques discussed herein, the vehicle may use a simulation component to simulate motion of the object based at least in part on the track associated with the object and/or a planned trajectory of the vehicle. This simulation component may be more complex and require more computational resources than a kinematic model, but the simulation component may determine a more accurate predicted trajectory for the active object. Whereas, in some examples, the kinematic model may not take into account operation(s) of the vehicle (and/or other objects) as part of determining the passive predicted trajectory, the simulation component may predict trajectories for the active objects based on the trajectories associated with up to all of the objects in the simulation, including one or more candidate trajectories for controlling the vehicle. The planning component may use this simulated predicted trajectory generated by the simulation component as part of planning operations of the vehicle.

In some examples, the techniques discussed herein may comprise a hierarchical process for determining which detected objects are classified as active objects. For computationally-constrained hardware, such as where simulation is devoted a certain amount or time of computation on the vehicle computing systems, a maximum number of active objects, k, may be permitted to be identified as active objects, where k is a positive integer. This maximum number may be based at least in part on the computational resources allotted for simulation and the average amount of computation required for simulation of a single active object or the total number of active objects. Note that the active objects may be individually simulated or may be simulated together with a simulation of the vehicle and all the active objects in a single simulation. In an example where a maximum number of active objects is enforced, the techniques may include determining, based at least in part on sensor data received by the vehicle, whether any objects detected by the vehicle are active public service objects. For example, a public service object may comprise an emergency vehicle (e.g., fire truck, ambulance, tow truck, etc.), law enforcement vehicle or cyclist, and/or the like. An active public service object may be a public service object that is on-duty or that is emitting a signal, such as a siren. If any active public service objects are detected, all such active public service objects may be allocated as active objects towards the maximum number of active objects.

If the number of active public service objects does not meet or exceed the maximum number of active objects, the techniques may then allocate the rest of the unallocated number of active objects to active object(s) determined based at least in part on an object's trajectory interacting with the vehicle and/or an object being associated with a right-of-way interaction with the vehicle.

Determining that an object has a trajectory that is likely to interact with the vehicle may comprise determining an object importance score for any remaining objects after any active public service objects have been identified and, if the number of remaining objects exceeds the number of unallocated active objects (i.e., k minus the number of active public service object(s), m), the techniques may classify the top k-n objects as active objects, as ranked by greatest object importance score. Determining the object importance score for an object may be based at least in part on a passive predicted trajectory determined for the object and may comprise the parallel processing and particular memory storage techniques discussed herein to reduce the computational complexity and latency of determining the object importance scores discussed herein. In some examples, the parallel processing may be accomplished by individual processing unit threads of a processing thread block of a processing unit, such as a graphics processing unit (GPU), tensor processing unit (TPU), or the like, with high thread count.

For example, the techniques may comprise determining a candidate trajectory for controlling the vehicle; sampling, by individual processing unit threads, vehicle states along the candidate trajectory and sampling, by individual processing unit threads, object states along the predicted trajectory(ies) associated with an object; determining, by an individual processing unit thread, a vehicle state and object state that interact based at least in part on proximity and/or orientation of the vehicle; and, for a vehicle state and object state that interact, determining, by individual processing unit threads, an interaction score. Interaction scores for a same object and a particular predicted trajectory associated with the object (there may be more than one predicted trajectory determined for an object, as discussed further herein) may be generated by individual processing unit threads and stored in a contiguous range of memory. The interaction scores stored in this range of memory may be reduced, via a parallel reduction operation, into a trajectory importance score for that object and particular predicted trajectory. In some examples, the parallel reduction may be implemented in CUDA or another language and may comprise a reduction operation, such as addition of the values (i.e., interaction scores here) or determination of a maximum value in the memory range.

Where multiple predicted trajectories have been determined for an object, this parallel reduction may result in a second memory range containing the trajectory importance scores for that object and its multiple predicted trajectories, i.e., one trajectory importance score per predicted trajectory for the object. If only a single predicted trajectory was determined for the object, the object importance score may be determined by multiplying the trajectory importance score by a confidence score associated with the predicted trajectory. In an example where multiple predicted trajectories have been determined for an object, a second parallel reduce operation may be conducted to determine the object importance score for that object. The second parallel reduction operation may comprise determining a sum of the values in the second memory range (which may individually be multiplied by the respective confidence scores of the predicted trajectories associated therewith, resulting in a weighted average) or the parallel reduce operation may comprise a maximum determination from among the values in the memory range. In either case, the values in the second memory range may be multiplied by a confidence score associated with the predicted trajectory for which a trajectory importance score was determined.

In some examples, the techniques for determining the object importance score may include determining an adversarial trajectory associated with an object if the passive predicted trajectory determined for the object is associated with a trust score that is less than a threshold trust score. For example, the techniques may determine a trust score associated with a predicted trajectory based at least in part on a track associated with the object, an extrapolation of the track, and a divergence of a current state of the vehicle and/or the predicted trajectory from the extrapolation. This adversarial trajectory may reduce overreliance by the relevance filter on passive predicted trajectories that are inaccurate, which may cause the object importance score to inaccurately reflect the relevance of an object's motion or state to the vehicle operational planning. In an example where a trust score determined for the passive prediction is determined to be below a trust score threshold, the relevance filter may generate a second passive predicted trajectory, i.e., an adversarial trajectory, that tracks from the current object location to a candidate trajectory for controlling the vehicle. In other words, this adversarial trajectory would essentially predict that the object will follow the candidate trajectory, which would result in a collision in some instances. See, for example, U.S. Pat. No. 11,577,741, filed Apr. 5, 2019, the entirety of which is incorporated by reference herein for all purposes. A second confidence score may be determined for this adversarial trajectory that may be based at least in part on the original confidence score for the passive predicted trajectory determined for the object. In some examples, the second confidence score may be inversely proportional to the original confidence score or the second confidence score may be assigned a predetermined confidence score that is relatively small (e.g., 0.1, 0.05, or the like where confidence scores range from 0 to 1). Note that the confidence score and the trust score differ in that the confidence score associated with a predicted trajectory or adversarial trajectory indicates a likelihood that the object will execute the predicted trajectory or adversarial trajectory; whereas the trust score indicates how well a predicted trajectory seems to fit a trend of historical and/or current states of the object. For example, if a vehicle currently has an orientation that is left of the predicted trajectory, it may be more likely that the vehicle is about to move further left.

If the number of active objects does not meet or exceed the maximum number of active objects after determining whether there are any active public service objects and classifying objects as active objects based at least in part on object importance score(s) (i.e., trajectory interaction with the vehicle), the techniques may then allocate the rest of the unallocated number of active objects to active object(s) determined based at least in part on an object being associated with a right-of-way interaction with the vehicle (i.e., up to k minus the number of active public service objects, m, minus the number of trajectory-interacting objects, n).

Classifying an object as an active object as a result of determining that that an object has a right-of-way interaction with the vehicle may comprise determining that the object satisfies one or more right-of-way detection criteria. In some cases, that predicted trajectory associate with an object may not interact with or otherwise come near a planned trajectory for the vehicle, which may result in a relatively low object importance score for the object. However, even non-trajectory-interacting objects may need to be included in the vehicle planning, such as pedestrians standing by a crosswalk or vehicles approaching a four-way stop that the vehicle is also approaching. See U.S. Patent Application No. 11,392,128, filed Apr. 19, 2019, and U.S. patent application Ser. No. 17/133,306, filed Dec. 23, 2020, the entirety of which are incorporated by reference herein for all purposes.

Determining satisfaction of this right-of-way detection criteria may comprise determining a current trajectory of the vehicle based at least in part on sensor data or receiving a route of the vehicle and determining, based at least in part on map data and the current trajectory or route, a salient map feature. The salient map feature may include roadway features that have a right-of-way associated therewith, which may include a portion of roadway proximate to a pedestrian or cyclist, since a vehicle needs to yield the right-of-way to either; a junction; crosswalk; or the like. In some examples, the techniques may include determining a first set of such salient feature(s) along the vehicle route. The techniques may additionally or alternatively include determining a second set of salient map feature(s) along an object's predicted trajectory or that the object is approaching and determining an intersection between the first set and the second set, which may include a subset of one or more salient map features. The techniques may identify the object (s) that are approaching the salient map feature and may sort this subset of object(s) according to distance of the object to the vehicle and/or vehicle route and/or whether the vehicle is approaching or departing from the vehicle route and/or the salient map feature. The techniques may classify as active objects up to the remaining number of unallocated active objects in the simulation, according to the ranking, i.e., the top k-m-n objects according to the sorting.

The techniques discussed herein may limit the computational resources for high accuracy motion and/or state prediction for objects that may be relevant to vehicle operational planning while ensuring that the most relevant objects are included in simulations for high fidelity motion and/or state prediction. Moreover, the techniques may reduce the computational complexity, bandwidth, and/or latency for determining object importance scores by using parallel sampling and interaction score determination and using parallel reduce operations to determine an object importance score from the interaction scores associated therewith. This may result in reducing the complexity of the processes run by the hardware and software of the vehicle to determine a course of action for controlling the vehicle and may result in a reduction in latency and increase in speed in this process. The techniques may also be used to reduce the number of and/or increase the accuracy of which locations over which a tree search predicts object movement, thereby reducing computational resource use and/or latency and/or increasing the accuracy of predicting a trajectory of an object in the tree search.

The techniques may additionally mitigate negative impacts on accuracy in object importance score determination that is based on low-trust predictions by generating adversarial trajectory(ies), thereby increasing the accuracy of the object importance score for such an object and ensuring that the objects most relevant to vehicle operational planning are included in high fidelity simulation. The techniques are also capable of classifying seemingly irrelevant objects as active objects using the right-of-way interaction detection techniques discussed herein. Overall, these techniques increase the safety and efficiency of an autonomous vehicle configured with the techniques discussed herein.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like.

Vehicle 102 is depicted as vehicle representation 104 in the representation 106. Representation 106 may be a depiction of a simulation generated by the vehicle 102, which may be based at least in part on perception data, prediction data, planning data, control data, and/or the like, as further discussed herein.

According to the techniques discussed herein, the vehicle 102 may receive sensor data from sensor(s) 108 of the vehicle 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 108 may generate sensor data, which may be received by computing device(s) 110 associated with the vehicle 102. However, in other examples, some or all of the sensor(s) 108 and/or computing device(s) 110 may be separate from and/or disposed remotely from the vehicle 102 and data capture, processing, commands, and/or controls may be communicated to/from the vehicle 102 by one or more remote computing devices via wired and/or wireless networks.

Computing device(s) 110 may comprise a memory 112 storing a perception component 114, a prediction component 116, a planning component 118, a relevance filter 120, and/or system controller(s) 122. In some examples, the relevance filter 120 need not be part of the planning component 118 but may provide its output as input to the planning component 118. In some examples, the perception component 114 may include a simultaneous localization and mapping (SLAM) component or, in additional or alternative examples, the SLAM component may be separate and may independently be trained using the seminal model discussed herein.

In general, the perception component 114 may determine what is in the environment surrounding the vehicle 102, the prediction component 116 may estimate (based on the perception data) what an object or environment state will be in the future, and the planning component 118 may determine how to operate the vehicle 102 according to information received from the perception component 114. For example, the planning component 118 may determine trajectory 124 for controlling the vehicle 102 based at least in part on the perception data, prediction data, an object importance score determined by the relevance filter 120, and/or other information such as, for example, one or more maps (such as a map determined according to the techniques discussed herein, prediction data, localization information (e.g., where the vehicle 102 is in the environment relative to a map and/or features detected by the perception component 114), and/or the like. In some examples, the planning component 118 may determine trajectory 124 based at least in part on one or more passive predicted trajectories determined for inactive objects in the environment and one or more simulated predicted trajectories determined for active objects in the environment, where the active and inactive objects are determined based at least in part on the techniques discussed herein.

The trajectory 124 may comprise instructions for controller(s) 122 to actuate drive components of the vehicle 102 to effectuate a steering angle, steering rate, acceleration, and/or the like, which may result in a vehicle position, vehicle velocity, and/or vehicle acceleration. For example, the trajectory 124 may comprise a target heading, target steering angle, target steering rate, target position, target velocity, and/or target acceleration for the controller(s) 122 to track. In some examples, the trajectory 124 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 122 may comprise software and/or hardware for actuating drive components of the vehicle 102 sufficient to track the trajectory 124. For example, the controller(s) 122 may comprise one or more proportional-integral-derivative (PID) controllers to control vehicle 102 to track trajectory 124.

FIG. 1 depicts an example of such a trajectory 124, represented as an arrow indicating a heading, velocity, and/or acceleration, although the trajectory itself may comprise instructions for a controller, which may, in turn, actuate a drive system of the vehicle 102. For example, the trajectory 124 may comprise instructions for controller(s) 122 of the vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 124 may comprise a target heading, target steering angle, target steering rate, target position, target velocity, and/or target acceleration for the controller(s) to track.

In some examples, the perception component 114 may receive sensor data from the sensor(s) 108 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 114 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) (e.g., a bounding box, bounding region) identifying a portion of sensor data associated with the object, object classification, object state (e.g., passenger loading/unloading, signaling turn, green/red light), and/or a confidence score indicating a likelihood (e.g., posterior probability) that the object classification, ROI, pose (i.e., position and heading), velocity, acceleration, state, and/or sensor data segmentation is correct/accurate (there may be confidence score generated for each in some examples). For example, the ROI may include a portion of an image or radar data identified by an ML model or ML pipeline of the perception component 114 as being associated with the object, such as using a bounding box, mask, an instance segmentation, and/or a semantic segmentation. The object classifications determined by the perception component 114 may distinguish between different object types such as, for example, a passenger vehicle, a pedestrian, a bicyclist, a delivery truck, a semi-truck, traffic signage, and/or the like.

In the depicted example, the perception component 114 may determine, based at least in part on sensor data, an object detection associated with object 126, a vehicle, and another object detection associated with object 128, also a vehicle in this case. Representations of these object detections are depicted as part of representation 106 as representation 132, which may be associated with object 126's object detection, and representation 134, which may be associated with object 128's object detection. These representations include a depiction of each three-dimensional ROI determined by the perception component 114 as part of each of the object detections for objects 126 and object 128. Representation 134 further includes an arrow depicting a current and/or predicted heading, position, velocity, and/or acceleration of object 128 that may also be part of the object detection determined in association with object 128. In some examples, the prediction component 116 may determine the predicted portion of the object detection. Object 128 may be stopped. The representation further includes depictions of object detections associated with a number of other pedestrians (smaller three-dimensional cuboids) and vehicles and their respective current and/or predicted headings, positions velocities, and/or accelerations that are unlabeled for clarity.

In some examples, the perception component 114 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

In some examples, any of this data determined by the perception component 114 may be indicated in a top-down representation of the environment. The top-down representation may comprise a data structure, such as a multi-channel image, where different channels of the image identify the existence, absence, or quality of a characteristic of the environment, as determined by the perception component based at least in part on sensor data received by the vehicle. For example, a portion of the top-down representation, such as a pixel, may indicate, depending on the channel of the image, the presence of an object at a location in the environment associated with that portion, an object classification of the object (e.g., one channel may indicate that presence or absence of a cyclist or a portion of a cyclist at a particular location in the environment), object heading, object velocity, map data (e.g., existence of a sidewalk, existence of and/or direction of travel associated with a roadway, signage location(s) and/or states, static object locations and/or classifications), and/or the like. Determining a top-down representation is discussed in more detail in U.S. Pat. No. 10,649,459, issued May 12, 2020, which is incorporated in its entirety herein for all purposes, and/or a top-down prediction associated with the environment, as described in more detail in U.S. patent application Ser. No. 16/779,576, filed Jan. 31, 2020, which is incorporated in its entirety herein for all purposes.

In some examples, object detections may be tracked over time. The perception component 114 and/or prediction component 116 may determine a track to associate with an object. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by the prediction component 116, in some examples.

The data produced by the perception component 114 may be collectively referred to as perception data. Once the perception component 114 has generated perception data, the perception component 114 may provide the perception data to prediction component 116, the planning component 118, and/or the relevance filter 120. In an example where prediction data generated by the prediction component 116 is used to generate a track, the prediction component 116 may also output such data to the relevance filter. However, in at least one example, the relevance filter may be uncoupled from the prediction component 116 and just a current and/or historical portion of a track may be used by the relevance filter 120 to generate an object importance score associated with an object/object detection.

In some examples, the prediction component 116 may receive sensor data and/or perception data and may determine a predicted state of dynamic objects in the environment. In some examples, dynamic objects may include objects that move or change states in some way, like traffic lights, moving bridges, train gates, and the like. The prediction component 116 may use such data to a predict a future state, such as an object state, position, orientation, velocity, acceleration, or the like, which collectively may be described as prediction data. For example, the prediction component may determine a prediction associated with object 128 indicating a predicted future position, orientation, velocity, acceleration, and/or state of object 128. In some examples, the prediction component 116 may comprise a pipeline of hardware and/or software, which may include one or more GPU(s), TPU(s), ML model(s), Kalman filter (s), a simulation component, and/or the like.

In some examples, the prediction component 116 may determine a passive predicted trajectory for up to each object within a threshold distance of the vehicle 102. This passive predicted trajectory may be determined by a kinematic model based at least in part on current and/or historical object data, such as a current and/or historical, position, orientation, velocity, and/or acceleration. The velocity and/or acceleration may include rotational, latitudinal, longitudinal, and/or other similar components. For objects identified as active objects according to the techniques discussed herein, the prediction component 116 may comprise a simulation component that determines a high fidelity predicted trajectory. For example, the simulation component may comprise one or more machine-learned models trained to estimate the predicted trajectory for an object in a top-down representation, three-dimensional environment, or an embedding space. Representation 106 may be a representation of part of a simulation determined by the simulation component that includes object data for objects classified as active objects according to the techniques discussed herein. In some examples, the prediction component 116 may output active trajectory(ies) for any objects classified as active objects and passive trajectory(ies) for any inactive objects classified as inactive objects according to the techniques discussed herein. Active objects may be estimated to affect and/or be affected by the vehicle 102's operation(s) whereas inactive objects may be estimated to be unlikely to affect and/or unaffected by the vehicle 102's operation(s).

The relevance filter 120 may comprise the architecture and processes discussed herein and may receive sensor data, an object detection from the perception component 114, and/or a passive predicted trajectory for the object from which to classify an object as an active or passive object. In an additional or alternate example, the relevance filter 120 may also receive a data structure indicating a top-down representation of the environment and/or a track associated with the object detection. The track may comprise current and/or historical data associated with the object detection in one example, although, in another example, the track may comprise current, historical, and/or predicted data associated with the object detection. This current, historical, and/or predicted data may indicate a series of classifications (for classifications that change over time, such as passenger loading/unloading, stopped, double-parked, parking, parked, door opened/closed, and/or the like), poses, velocities, accelerations, occlusion status (with respect to vehicle 102 or one or more sensors thereof), ROI, and/or the like associated with the object over time.

As discussed further herein, the relevance filter 120 may, in some instances, classify detected objects as an active object or an inactive object subject to a computational resources constraint. In such an instance, the relevance filter 120 may allocate active object computation bandwidth to object(s) the perception component 114 determines are active public service object(s), first, then may determine to allocate any remaining computational resources to object(s) having a greatest object importance score or, secondly, object(s) determined to satisfy a right-of-way interaction determination. The relevance filter 120 may determine the object importance score as a logit, that may indicate a likelihood (e.g., a posterior probability) that an object will affect/be affected by the vehicle 102's operations) as a number between 0 and 1, where O indicates no relevance (i.e., the vehicle 102 does not need to account for the object in planning an operation of the vehicle 102) and 1 indicates utmost relevance to the vehicle 102 (i.e., the vehicle 102 must account for the object in planning an operation of the vehicle 102). It is understood that a number between 0 and 1 is an arbitrary choice and any other suitable scoring regimen may be used, such as any positive integer, any positive integer between 0 and 100, a percentage, or any other integer.

To give an example, the relevance filter 120 may determine a first object importance score 136 associated with object 126 of 0.99 and a second object importance score 138 associated with object 128 of 0.3. The planning component 118 may use the first object importance score 136 to classify object 126 as an active object, the object data for which would then be used in a simulation to determine a more accurate prediction of the future behavior of object 126. Conversely, the planning component 118 may use the second object importance score 138 to classify the object 128 as an inactive object and use the passive predicted trajectory generated by the prediction component 116 for planning the trajectory 124 instead of using the simulation component of the prediction component 116 to determine a further predicted trajectory associated with object 128. In an additional or alternate example, the first object importance score 136 may exceed an object importance score threshold, whereas the second object importance score 138 may not meet the object importance score threshold. For scores between 0 and 1 this threshold could be adjusted to any suitable threshold, such as 0.3, 0.4, 0.5, 0.7, 0.8 or any other suitable threshold, depending on the distribution of scores for objects in the environment. In some examples, objects may be ranked based at least in part on their relevancy score and the most number of objects having the highest scores may be selected based on, for example, available computational resources.

The planning component 118 may use the perception data received from perception component 114, one or more object importance scores received from relevance filter 120, and/or prediction data received from the prediction component 116 (which may include passive predicted trajectory (ies) for objects classified as being inactive object(s) and/or simulated predicted trajectory(ies) for objects classified as being active objects), to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data).

The planning component 118 may use the perception data, object importance score(s), and/or prediction data to determine a path for the vehicle 102 from a first location to a second location; generate, substantially simultaneously and based at least in part on the perception data and/or simulated perception data (which may further include predictions regarding detected objects in such data), a contiguous series of candidate trajectories for controlling motion of the vehicle 102 to reach the second location from the first location; and generate a drive control signal that may be transmitted to drive components of the vehicle 102 to accomplish the series of candidate trajectories. In some examples, the planning component 118 may generate the path for controlling an autonomous vehicle based at least in part on a tree search technique that alternately determines a candidate action and predicts a future state of the environment (based on the passive and/or simulated predicted trajectory(ies) of object(s) responsive to the candidate action. The tree search may determine an action for the vehicle to carry out based at least in part on determining costs associated with different candidate actions and selecting one of the candidate actions based on a cost associated therewith from among the multiple candidate actions and their respective costs.

Example System

Figure 2:
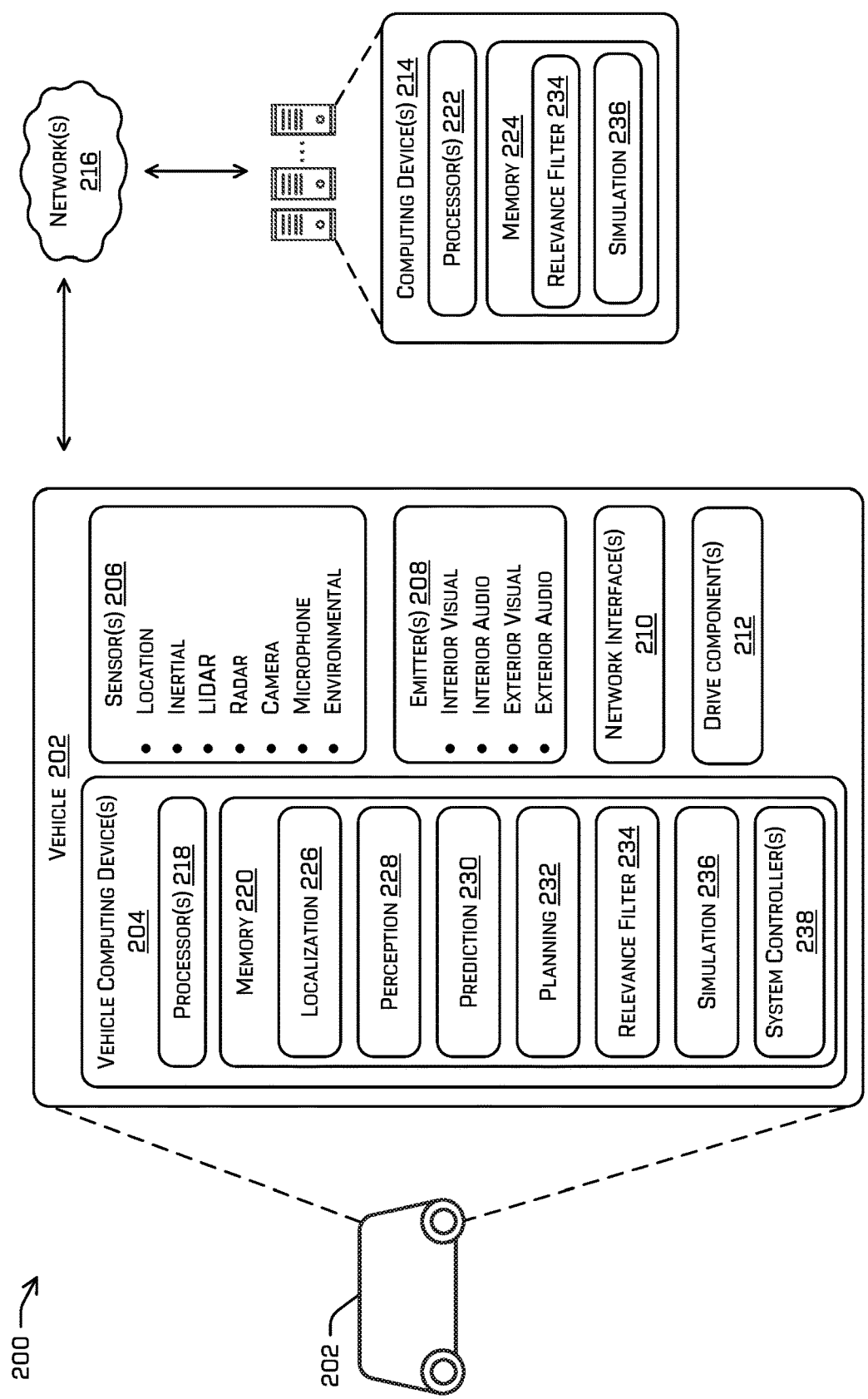
FIG. 2 illustrates a block diagram of an autonomous vehicle comprising a relevance filter and computing device (s) for training the relevance filter.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device (s) 204, sensor(s) 206, emitter(s) 208, network interface(s) 210, and/or drive component(s) 212. Vehicle computing device(s) 204 may represent computing device(s) 110 and sensor(s) 206 may represent sensor(s) 108. The system 200 may additionally or alternatively comprise computing device(s) 214.

In some instances, the sensor(s) 206 may represent sensor (s) 108 and may include lidar sensors, radar sensors, ultrasonic transducers, sonar sensors, location sensors (e.g., global positioning system (GPS) global navigation satellite system (GNSS), compass, atomic clock, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), a depth position sensor (e.g., a lidar sensor, a radar sensor, a sonar sensor, a time of flight (ToF) camera, a depth camera, an ultrasonic and/or sonar sensor), microphone(s), wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar and/or lidar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and without limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and without limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud and/or edge computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G LTE, 5G, etc.), and/or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 112. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media that may store processor-executable instructions. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), dynamic random access memory (DRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, relevance filter 234, simulation component 236, and/or system controller(s) 238-zero or more portions of any of which may include hardware, such as GPU(s), TPU(s), CPU(s), and/or other processing units. Perception component 228 may represent perception component 114, prediction component 230 may represent prediction component 116, planning component 232 may represent planning component 118, relevance filter 234 may represent relevance filter 120, and/or system controller(s) 238 may represent controller(s) 122.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, velocity, and/or acceleration of the vehicle 202. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228 and/or planning component 232 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current and/or historical position, heading, velocity, acceleration, etc. associated with an object), a state of the object (e.g., siren on/off, passenger loading/unloading, red/green light, yield indicated, speed indicated), and/or the like. The perception component 228 may include a prediction component 230 that predicts future actions/states of dynamic objects in the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects and/or map data in the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. The future (predicted) state may indicate a predicted object position, orientation, velocity, acceleration, and/or other state (e.g., door state, turning state, intent state such as signaling turn) of a detected object. Data determined by the prediction component is referred to as prediction data and may be part of the perception data. In some examples, the prediction component may determine a top-down representation of a predicted future state of the environment. For example, the top-down representation may be an image with additional data embedded therein, such as where various channel pixel values encode the prediction data discussed herein.

In some examples, the prediction component 230 may comprise a kinematic model that may determine a passive predicted trajectory for an object detected by the perception component 228. This kinematic model may use a current and/or historical object pose (i.e., position and/or orientation), moment of inertia, average mass associated with the object classification, velocity, acceleration, and/or environmental data to determine the passive predicted trajectory. The environment data may include, for example, surface data that may be determined based at least in part on map data (e.g., asphalt, smooth concrete, scored concrete) and/or weather conditions determined based at least in part on sensor data (e.g., ice, rain, snow, air density, dew point, wind speed/direction), which may be used to determine various coefficients that may be used by the kinematic model, such as friction coefficients, drag, etc.

In some examples, the prediction component 230 may comprise the simulation component 236 for determining simulated predicted trajectories for objects classified as active objects by the relevance filter 234, although in some examples, the simulation component 236 may be a separate component from the prediction component 230. In some examples, the simulation component 236 may comprise a reinforcement learning trained machine-learned model (e.g., a neural network, transformer, or the like), a neural network, and/or Monte Carlo simulation, although other suitable high-fidelity motion and state prediction models can be used. Whereas, in some examples, the kinematic model may not take into account operation(s) of the vehicle (or other objects) as part of determining the passive predicted trajectory, the simulation component may predict trajectories for the active objects based on the trajectories associated with up to all of the objects in the simulation, including one or more candidate trajectories for controlling the vehicle. In some examples, the simulation component 236 may work in conjunction with a tree search component of the planning component 232 to generate a trajectory for controlling the vehicle. For example, the simulation component 236 may determine an active predicted trajectory of an object that is based at least in part on a candidate trajectory that is being evaluated by the tree search as a candidate for controlling the autonomous vehicle. In some examples, the simulation component 236 may determine an active predicted trajectory based on or responsive to the candidate trajectory.

The relevance filter 234 may comprise the hardware and/or software discussed herein for classifying objects detected by the perception component 228 as active objects or inactive objects. In some examples, the relevance filter may receive passive predicted trajectories for up to all the objects detected by the perception component 228 or all of the objects within a threshold distance of the vehicle 202. In some examples, this threshold distance may be set based at least in part on a velocity of the vehicle 202. For object(s) classified as active object(s) by the relevance filter 234, a simulated predicted trajectory may be determined by the simulation component 236 that may replace or additionally be associated with the object(s) classified as active object(s). In some examples, the relevance filter 234 and/or simulation component 236 may be part of the prediction component 230.

The planning component 232 may receive a location and/or orientation of the vehicle 202 from the localization component 226, and/or perception data from the perception component 228, and/or prediction data from the prediction component 230 (which May comprise active and/or simulated predicted trajectory(ies) of objects) and may determine instructions for controlling operation of the vehicle 202 based at least in part on any of this data. In some examples, the memory 220 may further store map data and this map data may be retrieved by the planning component 232 as part of generating environment state data and/or determining a trajectory for controlling the vehicle 202. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., as part of determining a simulate predicted trajectory), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The planning component 232 may be a primary component for determining control instructions for the vehicle 202, such as during operation of the vehicle 202 in nominal conditions; however, the planning component 232 may further comprise and/or the vehicle 202 may additionally comprise separately from the planning component 232 a tree search. The tree search may determine a trajectory and/or path for controlling the vehicle contemporaneously with the planning component 232, such as to determine a contingent trajectory and/or path for controlling the vehicle 202 when a trajectory determined by the planning component 230 fails to be generated (e.g., the planning component 232 can't determine a suitable trajectory that avoids objects) and/or that violates a comfort metric, such as a threshold acceleration and/or jerk, or a rule of the road. Additionally or alternatively, the tree search may be the primary means of generating a trajectory for controlling the vehicle. In some examples, the raw output of the tree search may be a series of control states (e.g., position and/or heading of the vehicle, steering angle, and/or velocity) that may be used to generate the trajectory, i.e., the commands that the drive component(s) 212 may use to actuate the drive system of the vehicle 202.

In some examples, the tree search may comprise a search algorithm such as, for example D*, D*lite, Focused Dynamic A*, A*, LPA*, Dijkstra's algorithm, and/or the like, although other search algorithms for searching and/or generating a directed graph and/or a weighted directed graph may be used. Additionally or alternatively, the tree search may determine a determinized sparse partially observable tree (DESPOT) determined according to a partially observable Markov decision process (POMDP). The tree search may manage determining the action node(s) and/or prediction node(s) of the tree search by transmitting a request for the planning component to generate candidate action(s) based at least in part on an environment determined in association with a prediction node and/or one or more heuristic candidate action(s) may be used, such as various patterns of braking, accelerating, and/or steering (e.g., maintaining a current velocity and steering angle, staying in a lane, executing various typical turns or other maneuvers).

A candidate action determined by the planning component 232 may be associated with a corresponding action node in the tree search and/or a prediction node. The prediction node may indicate a predicted state of the vehicle, a predicted trajectory of an active object, and/or the environment that would result from the vehicle carrying out the candidate action. In some examples, the prediction component 230 and/or the simulation component 236 may determine a predicted trajectory to associate with an active object identified according to the techniques discussed herein. For example, the prediction node may use the passive predicted trajectory for an object classified as a passive object and may determine a new active predicted trajectory for any active objects classified by the techniques discussed herein, wherein the new predicted trajectory may be based at least in part on the candidate action (e.g., this active predicted trajectory may be responsive to the candidate action). In some examples, since a passive predicted trajectory may be more inaccurate than an active predicted trajectory, the tree search may add noise to the passive predicted trajectory, resulting in a heat map associated with a region generated from the passive predicted trajectory that may be used to determine a sub-cost for the passive predicted trajectory that is part of the overall cost for a candidate trajectory. In some examples, the prediction node may be based at least in part on sensor data, the candidate action, and/or a previous prediction node if the prediction node is in a layer of prediction nodes beyond a first layer of prediction nodes.

The tree search may determine an action for the vehicle to carry out based at least in part on determining costs associated with different candidate actions and selecting one of the candidate actions based on a cost associated therewith from among the multiple candidate actions and their respective costs. For example, each of the different trajectories in the example above for a single candidate action may be individually scored using cost functions associated with different target priorities for operating the vehicle, such as safety, comfort, progress, etc. The cost may be based at least in part on a likelihood of object impact, safety, vehicle progress along a route, passenger comfort, drive dynamics, and/or the like. For example, a safety objective may be associated with multiple different sub-costs that may be based at least in part on the proximity to an object that a candidate action would bring the vehicle, minimum braking distance or maximum braking force to a nearest object, conformance to rules of the road, and/or the like. A passenger comfort objective may be associated with determining an acceleration or jerk associated with the candidate action and/or one or more lateral and/or longitudinal velocity, acceleration, and/or jerk thresholds. The cost may be based at least in part on the candidate action itself and/or the state indicated by a predicted state of the environment associated with the prediction node.

The tree search may receive map data and an initial state of the environment from the perception component 228 (i.e., in association with a root node of the tree search), which may include static object detections to be aggregated with the map data to create environment state data, dynamic object data, self-reflexive vehicle 202 data (e.g., received from the localization component 226), and/or track(s) associated with the vehicle 202 and/or one or more detected dynamic object(s).

In some examples, the tree search may transmit this initial environment state to the planning component 232 and may receive one or more candidate actions from the planning component 232. For examples that use the cost function to determine the cost discussed herein, the tree search may transmit at least one of these one or more candidate actions to the simulation component 236 and/or the prediction component 230, which may determine a predicted state of the environment that is based at least in part on the candidate action. The tree search may iteratively determine action nodes and prediction nodes up to a time horizon and may select a series of candidate trajectories associated with a lowest cost to form a path for controlling the vehicle 202. For example, the time horizon may be a length of time into the future from a current time (e.g., 500 milliseconds, 1 second, 2, seconds, 5 seconds, 8 seconds, 10 seconds). This length of time may be associated with controlling the vehicle for the next m units of time, where m is a positive integer. A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the tree search is used when a nominal planning component failed to create a valid trajectory or path, the tree search may terminate upon determining a valid path (e.g., a path that is impact-free and conforms to a rule set, which may specify comfort metrics, conformance to laws, etc.). In additional examples, iterations may continue until an objective is achieved (e.g., a successful lane change, a successful merge, or any other completed action). In any one or more examples, any combination of the above may further be used as decision points for branching the tree. Further examples of the cost determination and tree search are discussed in U.S. patent application Ser. No. 18/217,138, filed Jun. 30, 2023, the entirety of which is incorporated by reference herein for all purposes.

In some examples, the map data may comprise a two-dimensional or three-dimensional representation of the environment, characteristic(s) associated therewith, and/or embedding(s). The map data may comprise a previously generated representation and/or labels of the environment. However, sensor data and/or perception data may be used to augment the map data. A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example.

In some examples, the simulation component 236 may determine a simulation of the environment, movement of one or more objects classified as being active objects by the techniques discussed herein, and/or the vehicle 202. In some examples, this simulation may be based at least in part on sensor data, perception data, localization data, object data (e.g., an object detection and/or track), and/or planning data, such as a candidate trajectory for controlling the vehicle 202. The simulation may comprise a representation of a position, orientation, movement (e.g., velocity, acceleration, jerk, snap), and/or quality of portions of the environment and/or the vehicle 202. The environment may comprise an object, such as another vehicle, a pedestrian, vegetation, a building, signage, and/or the like.

The simulation component 236 may determine scenario parameters for instantiating the simulation based at least in part on perception data, localization data, object data, map data, and/or planning data. In some examples, the simulation may comprise a two or three-dimensional representation of the scenario. For example, a three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In some examples, the scenario parameters may identify a position of an object and/or the vehicle 202, an area occupied by the object and/or the vehicle 202, a velocity and/or acceleration associated with the object and/or the vehicle 202, whether the object is static or dynamic, an object type associated with the object (e.g., a classification such as "pedestrian," "bicyclist," "vehicle," "oversized vehicle," "traffic light," "traffic signage," "building," "roadway," "crosswalk," "sidewalk"), and/or other kinematic qualities associated with the object and/or the object type (e.g., a friction coefficient, an elasticity, a malleability). As regards the environment itself, the scenario parameters may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario parameters may be generated based at least in part on map data stored in the memory 220.

The planning component 232 may generate a trajectory for controlling vehicle 202, which may be used by the simulation component 236 to control a simulated representation of the vehicle 202 in addition to or instead of sending instructions to the drive component(s) 212 to implement the trajectory. In some examples, the trajectory may additionally or alternatively be provided to the system controller(s) 238 and hardware-in-the loop or an output of the system controller(s) 238 may be used to control a simulation of the vehicle 202. Accordingly, this trajectory and/or instructions determined by system controller(s) 238 may control a simulated position, orientation, velocity, acceleration, state, and/or turn rate of a simulated vehicle in a simulated environment generated by the simulation component 236.

The simulation component 236 may comprise one or more machine-learned models, which may be used in addition to or instead of kinematic models. These machine-learned models may be trained to predict object motion and/or states based at least in part on the scenario data discussed herein.

As described herein, the localization component 226, the perception component 228, the prediction component 230, the planning component 232, simulation component 236, and/or other components of the system 200 may comprise one or more machine-learned (ML) models. For example, localization component 226, the perception component 228, the prediction component 230, the planning component 232, simulation component 236, and/or other components of the system 200 may each comprise different ML model pipelines. In some examples, an ML pipeline may comprise multiple ML models and/or other components, such as hardware and/or deterministic software. In some examples, an ML model may comprise a neural network, transformer, or the like, which may be trained using supervised, unsupervised, or semi-supervised techniques. For example, supervised training may comprise determining a loss based at least in part on a difference between an output of the ML model and ground truth and altering one or more parameters of the ML model to reduce the loss according to gradient descent.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 238 (which may be a portion of the drive component(s)), which may be configured to control steering, propulsion, braking, safety, emitters, communication, and other systems of the vehicle 202. These system controller(s) 238 may communicate with and/or control corresponding systems of the drive component(s) 212 and/or other components of the vehicle 202. For example, the planning component 232 may generate instructions based at least in part on perception data generated by the perception component 228 and/or prediction data determined by prediction component 230 and/or simulation component 236 and transmit the instructions to the system controller(s), which may control operation of the vehicle 202 based at least in part on the instructions.

It should be noted that while example system 200 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Relevance Filter Configuration

Figure 3:
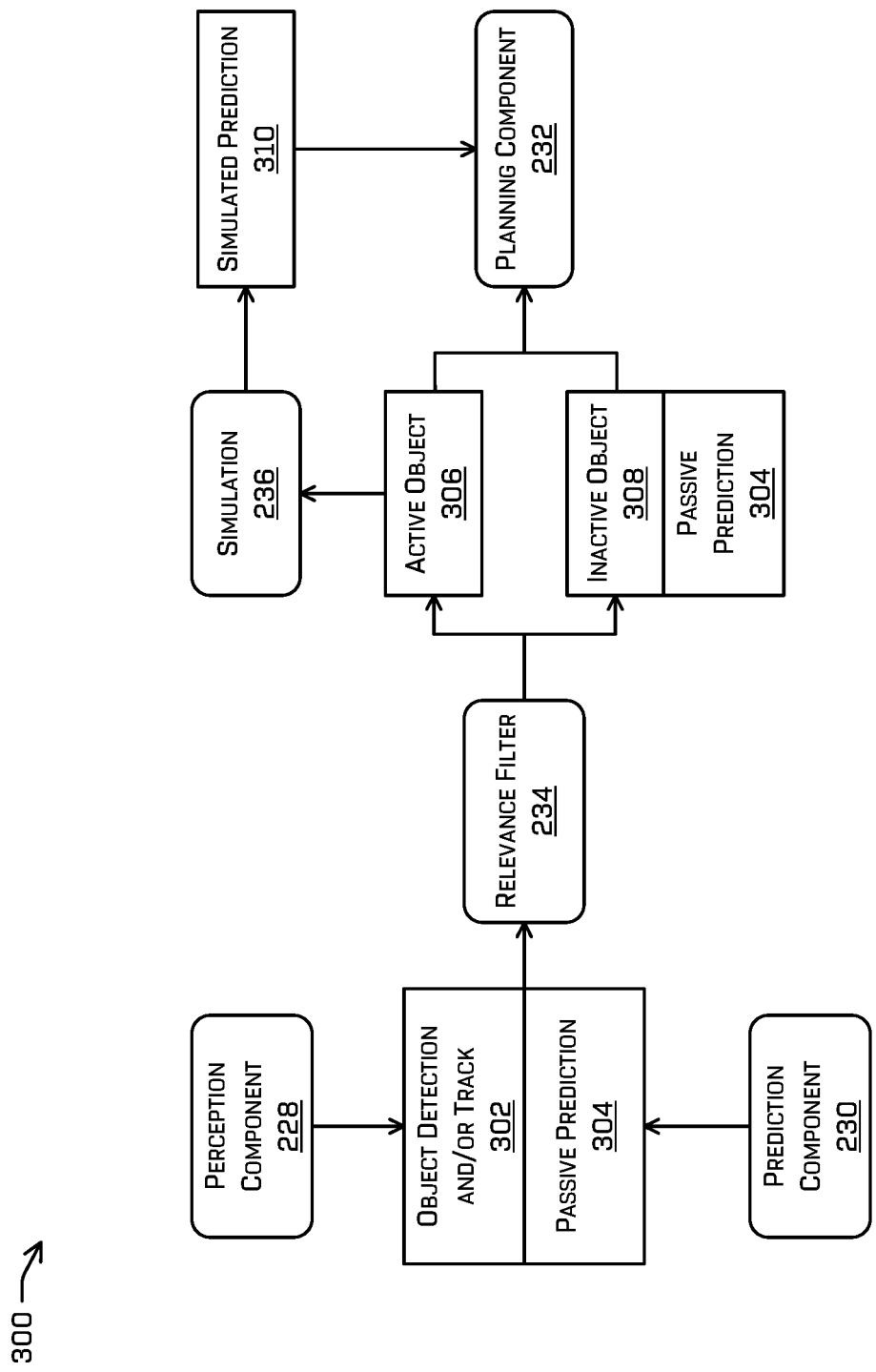
FIG. 3 illustrates a block diagram of an example configuration comprising the relevance filter discussed herein for determining which objects to classify as active objects that are likely to influence or be influenced by operations of the vehicle and that may be simulated using a simulation component.

FIG. 3 illustrates a block diagram of an example architecture 300 comprising the relevance filter 234 discussed herein for determining which objects to classify as active objects that are likely to influence or be influenced by operations of the vehicle 202. An object classified as an active object may be simulated using a simulation component 236 to determine a simulated predicted trajectory for that object.

In some examples, a perception component 228 of the vehicle 202 may receive sensor data and use the sensor data to detect an object in the environment. Based on this detection, the perception component 228 may output an object detection and/or object track 302 associated with the object. In some examples, an object detection may identify various characteristics and/or states associated with the object, as discussed above, and the object track may identify current and/or historical object detection data. For example, the object track may identify a series of object detections associated with an object. In some examples, the object detection may indicate a classification of the object, which may include a classification that the object is a public service object, vehicle, passenger, cyclist, or the like and/or a state of the object (e.g., siren on/off, passenger loading/unloading, red/green light, yield indicated, speed indicated, left/right turn signal activated).

In some examples, the prediction component 230 may use the sensor data and/or the object detection and/or object track 302 to determine a passive prediction 304 associated with the object. In some examples, the passive prediction 304 may comprise a passive predicted trajectory associated with the object and/or a predicted state of the object. As discussed above, this passive prediction may be generated by a kinematic model.

The object detection and/or track 302, and/or passive prediction 304 may be provided as input to the relevance filter 234, which may determine to classify an object as an active object 306 or an inactive object 308. An object detection and/or track 302 associated with an object classified as an active object 306 may be provided as input to the simulation component 236. In some examples the passive prediction 304 for that object may additionally or alternatively provided to the simulation component 236. In some examples, the simulation component 236 may use the object detection and/or track 302 and/or the passive prediction 304 to determine scenario parameters for instantiating and/or controlling a two- or three-dimensional simulation of movement and/or state(s) of the object over a time period up to a time horizon, such as 1 second, 2 seconds, 4 seconds, 8 seconds, or any other time in the future. The simulation component 236 may output the operations of a simulated version of the object in the simulation as a simulated prediction 310 for the object. The simulated prediction 310 may comprise a predicted trajectory and/or state of the object. Such a predicted trajectory may comprise an estimated future position, orientation, velocity, acceleration, and/or the like. Whereas, in some examples, the kinematic model may not take into account operation(s) of the vehicle (or other objects) as part of determining the passive predicted trajectory, the simulation component may predict trajectories for the active objects based on the trajectories associated with up to all of the objects in the simulation, including one or more candidate trajectories for controlling the vehicle. For example, the simulation may include simulated operations of up to all of the objects classified as active objects and these simulated operations may, in some examples, be determined based at least in part on each other.

The simulated prediction(s) determined for any active objects and the passive prediction(s) determined for any inactive objects may be provided as input to the planning component 232. In some examples, the object detection and/or track 302 associated with either an active or inactive object may additionally or alternatively be provided as input to the planning component. In additional or alternate examples, the passive prediction determined for an object that is subsequently classified as an active object may be provided to the planning component 232 in addition to the simulated prediction, although in some examples, the simulated prediction may replace the passive prediction for that object. The relevance filter 234 may additionally or alternatively concatenate the active/inactive classification for an object to the object detection and/or track 302, which may be provided to the planning component 232. In some examples, the relevance filter 234 may additionally or alternatively provide an active public service object classification, object importance score, and/or right-of-way determination to the planning component in association with an object detection and/or track 302 for an object.

In some examples, the simulated prediction 310 for an object may be part of a tree search where the simulated prediction 310 is determined based at least in part on a candidate action for controlling the vehicle that is determined as part of the tree search. This simulated prediction 310 may iteratively/progressively be updated as further candidate actions (in time or in distance) are determined for the vehicle. For example, the tree search may iteratively determine different candidate actions for each time step of a series of time steps. The simulation component may determine a simulated prediction 310 based at least in part on a candidate action and the tree search may select a first candidate action associated with a first time step to use to explore further candidate actions stemming from the first candidate action at a second time step. In some examples, a cost may be determined by a cost function for each candidate action based at least in part on the simulated prediction(s) for the active object(s) and the passive prediction(s) for the inactive object(s). The simulation component may update the simulated prediction 310 for an object that was determined for the first candidate action based at least in part on one of the candidate actions determined for the second time step. The tree search may repeat this process until a time horizon, distance, or target location is achieved. The tree search may also account for inactive objects, but may use the passive prediction for those objects. In some examples, the passive prediction 304 may be determined by the tree search using a kinematics model or neural network, but that isn't based on the candidate action(s) of the vehicle.

Example Process for Classifying Objects as Active Objects

Figure 4:
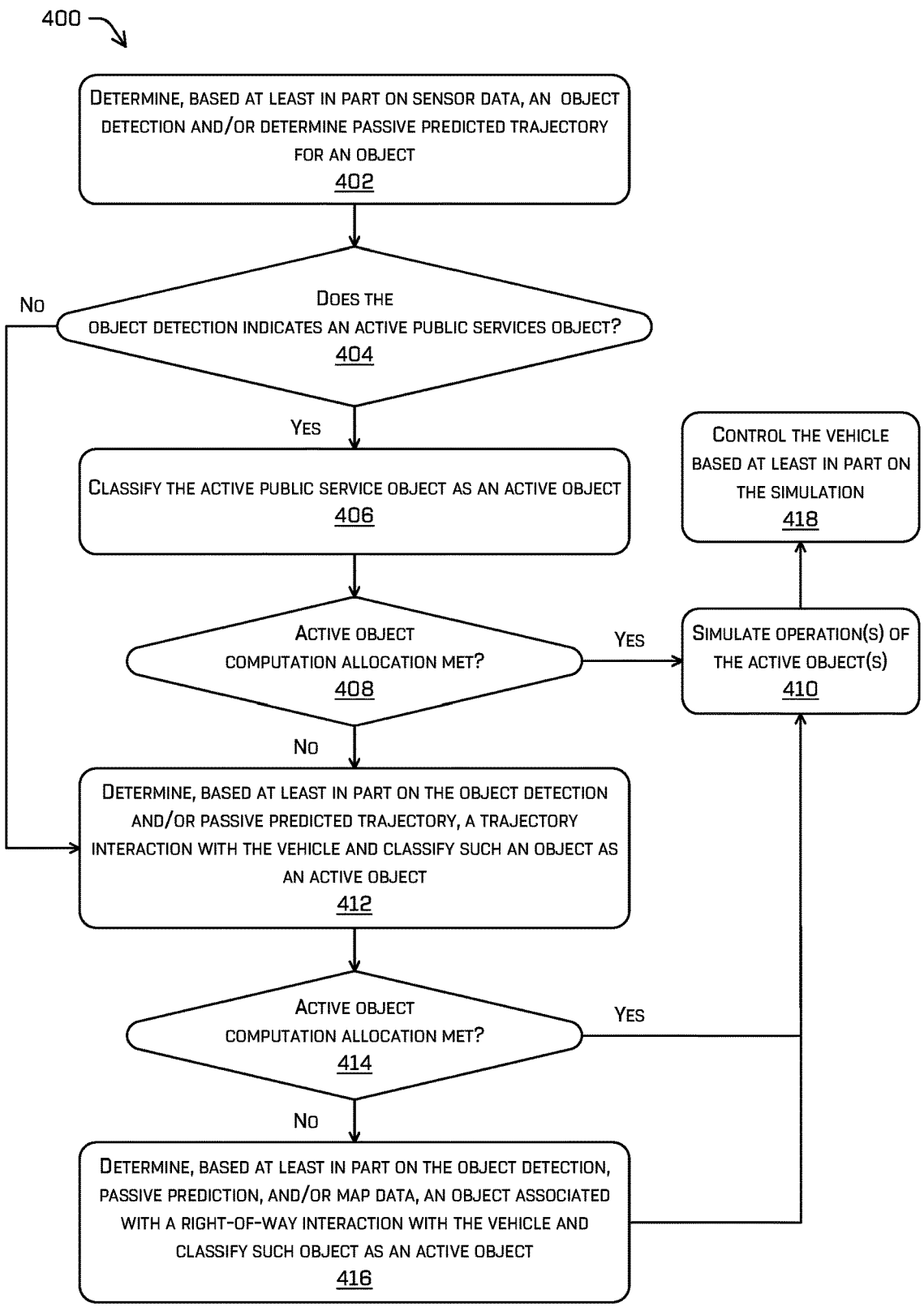
FIG. 4 illustrates a flow diagram of an example process for determining which objects to classify as active objects for simulation when a computation resource constraint exists.

FIG. 4 illustrates a flow diagram of an example process 400 for determining which objects to classify as active objects for simulation when a computation resource constraint exists. If computation massively increases in the future, motion and/or states of all objects may be simulated. However, it is likely that even with rapid advancements in computation, simulation computations may not be allowed to take over all the available compute and may be devoted a certain amount of time or computational resources for its operations so as not to impede other computations executed by the vehicle. In some examples, example process 400 may be executed by a vehicle, such as vehicle 202, although it is understood that example process 400 may additionally or alternatively be executed at a remote computing device, such as an edge or cloud computing device. In some examples, at least part of example process 400 may be accomplished by example architecture 300. More specifically, the relevance filter 234 may execute part or all of operation(s) 404-408, 412, and 414 and the perception component 228, prediction component 230, simulation component 236, and/or planning component 232 may execute part or all of operation(s) 402, 404, 410, and/or 416, respectively.

At operation 402, example process 400 may comprise determining, based at least in part on sensor data, an object detection indicating that an object exists an environment associated with a vehicle and/or determining a passive predicted trajectory for the object, according to any of the techniques discussed herein. In some examples, determining the passive predicted trajectory may be based at least in part on the object detection, a track associated with the object (which may be part of the object detection), and/or sensor data. Determining the passive predicted trajectory may additionally or alternatively include determining a confidence score (e.g., a likelihood/posterior probability) that the predicted trajectory is accurate. In some examples, the passive predicted trajectory confidence score may be based at least in part on map data, a track associated with the object, and/or the like.

In some examples, the object detection may indicate a position, orientation, velocity (e.g., lateral, longitudinal, rotational, otherwise), acceleration (e.g., lateral, longitudinal, rotational, otherwise), an object classification (e.g., a type of object, such as public service object, vehicle, pedestrian, construction worker, etc.—one or more classifications may be associated with an object), sensor data segmentation (e.g., mask, instance segmentation, semantic segmentation), a region of interest (ROI) (e.g., a two- or three-dimensional bounding box, bounding region) identifying a portion of sensor data associated with the object, object state (e.g., passenger loading/unloading, signaling turn, green/red light, siren active/inactive, speaker active/inactive), and/or a confidence score indicating a likelihood (e.g., posterior probability) that any such data is correct/accurate (there may be confidence score generated for each in some examples). In some examples, one or more object detections may be determined, one for each object detected in an environment associated with the vehicle. In some examples, an object detection may include a default indication (e.g., as indicated by a flag in a register or a binary value in a data structure that makes up the object detection) that the object is classified as an inactive object unless or until otherwise indicated according to the techniques discussed herein. Additionally or alternatively, one passive predicted trajectory may be determined for each object or each object within a threshold distance of the vehicle. A passive predicted trajectory may be generated by a kinematic model based at least in part on the object detection and/or object track. In some examples, the kinematic model may not take into account operation(s) of the vehicle and/or other objects as part of determining the passive predicted trajectory.

At operation 404, example process 400 may comprise determining whether any of the object detections indicate that an object has been classified as a public service object and determined to be active, according to any of the techniques discussed herein. In some examples, determining that a public service object is active may comprise determining, based at least in part on sensor data, that a siren, speaker (e.g., for giving vocal commands), lights, or the like are activated. If the no object detections indicate an object that has been classified as a public service object or that no detected public service object(s) are active, example process 400 may continue to operation 412. However, if an object detection indicates that an object has been classified as a public service object and determined to be active, example process 400 may continue to operation 406.

At operation 406, example process 400 may comprise classifying the active public service object as an active object, according to any of the techniques discussed herein. In some examples, operation 406 may comprise concatenating the active object classification to the public service object's object detection or altering a default indication that the object is an inactive object in an object data structure that composes the object detection to indicate that the object is classified as an active object. In some examples, determining to classify an object as an active object may allocate computation resources towards that object as part of the simulation at operation 410. In some examples, example process 400 may simulate object(s) as they are classified as active objects, resulting in multiple simulation runs, or, in another example, example process 400 may simulated any objects classified as active objects once the computation allocation limit has been met or operation 414 has finished, resulting in a single simulation of all the active objects or simulations of subsets of the active objects.

In an additional or alternate example, active public service object may be assigned an object importance score and may be included in the classification determination at operation 566. However, the object importance score assigned to active public service objects may be assigned a fixed value instead of using the object importance score determination operations of example process 500. The fixed value may, instead, be the maximum importance score, such as 1, plus some heuristic value (e.g., 0.01, any other number since the maximum importance score needs only be increased by a marginal amount to ensure the active public service object(s) are classified as active object(s)).

At operation 408, example process 400 may comprise determining whether a computation allocation limit has been met by the number of objects classified as active objects so far, according to any of the techniques discussed herein. In some examples, the computation allocation limit may be indicated as a total number of objects that may be classified as active objects and/or a total amount of compute or time that a simulation for the total number of active objects may be run. In examples where the computation allocation is tolled in compute amount or time, an estimate of the amount of compute or time necessary to simulate the objects classified as active objects may be determined at operation 408 based at least in part on a scene complexity, which may be based at least in part on sensor data, perception data, and/or prediction data. Regardless, at operation 408, example process 400 may determine whether allocating computation resources to the objects classified as active objects would result in a sum computation allocation that would meet or exceeds the computation allocation limit. If the limit would be met, example process 400 may continue to operation 410. If the limit would not be met, example process 400 may continue to operation(s) 412 and/or 416. In some examples, example process 400 may proceed to operation 412 then, if the computation allocation limit isn't met by any additional active objects determined by operation 412 and allocated computation allocation, example process 400 may continue to operation 400. In another example, example process 400 may proceed to operations 412 and 416 in parallel, and may determine, based at least in part on the output of operations 412 and 416, the object(s) to classify as active objects.

At operation 412, example process 400 may comprise determining, based at least in part on the object detection and/or passive predicted trajectory, a trajectory interaction with the vehicle and/or classifying such an object as an active object, based at least in part on the sensor data, according to any of the techniques discussed herein. Operation 412 is discussed in further detail regarding FIGS. 5A-5D, but at a high level, operation 412 may comprise determining whether the passive predicted trajectory and/or an adversarial predicted trajectory interact with a trajectory of the vehicle and, if so, determining an object importance score associated with the object. In some examples, where allocating computation resources to the number of objects for which an object importance score is determined would result in exceeding the remaining computation resources, operation 412 may comprise classifying as active object(s) the top n number of objects, ranked by object importance score. In some examples, n may be the quantity of objects that can be classified as active objects and allocated computation resources without exceeding the computation allocation limit. Conversely, where allocating simulation bandwidth to the number of objects for which an object importance score was determined would not result in exceeding the active object computation allocation limit, all of the objects for which an object importance score may be classified as active objects. In some examples, operation 412 may be followed by operation 414.

At operation 414, example process 400 may comprise determining whether a computation allocation limit has been met by the number of objects classified as active objects so far, according to any of the techniques discussed herein. Operation 414 may be similar to operation 408 but with any additions to the number of active objects made by operation 412. If the limit would be met, example process 400 may continue to operation 410. If the limit would not be met, example process 400 may continue to operation(s) 416.

At operation 416, example process 400 may comprise determining, based at least in part on an object detection, passive prediction, and/or map data, an object that is associated with a right-of-way interaction with the vehicle and classifying such an object as an active object, according to any of the techniques discussed herein. Operation 416 is discussed in further detail regarding FIGS. 6, 7A, and 7B. However, at a high level, operation 416 may determine a salient map feature that both the vehicle and an object are approaching, regardless of whether the vehicle and the object's trajectories interact, and determining that the object is one of the closest objects to the vehicle that is approaching the salient map feature. Salient map features may include, for example, roadway features that have a right-of-way associated therewith (e.g., a controlled or uncontrolled intersection), a portion of roadway proximate to a pedestrian or cyclist, a junction, crosswalk, or the like. For many of those examples, the object might not have a trajectory that interacts with the vehicle, since the object may be slowing its approach to such a feature or may not be in the roadway or currently moving toward the feature (such as a pedestrian on a sidewalk or a cyclist in a cycling lane).

However, these object(s) may have a right-of-way and the simulation component may more accurately simulate future operation(s) of the object in such an instance, whereas a kinematic model might simply predict that an object will stop or that a pedestrian will continue walking along a sidewalk that is near a crosswalk. To extend these examples, the simulation component may determine that an object may preliminarily stop and then proceed through the junction and/or that the pedestrian may enter the roadway to cross the sidewalk. The simulation component may be able to make these predictions since it may include a machine-learned model pipeline trained using the reinforcement learning and/or Monte Carlo simulation, two examples of which are capable of handling the likelihoods of these occurrences since they may account for the vehicle's behavior, rules of the road, previously exhibited behavior reflected in training data, more detailed data that may make up the simulation (e.g., perception data, prediction data, environment data) that may exceed the more rudimentary data processed by a kinematic model.

In some examples, where allocating computation resources to the number of objects for which a right-of-way interaction is determined would result in exceeding the remaining computational resources, operation 412 may comprise classifying as active object(s) the top o number of objects, ranked by distance to the vehicle or an order defined by a rule of the road. In some examples, o may be the quantity of objects that can be classified as active objects and allocated computation resources without exceeding the computation allocation limit. Conversely, where allocating computation resources to the number of objects for which a right-of-way interaction was determined would not result in exceeding the computation allocation limit, all of the objects for which a right-of-way interaction was determined may be classified as active objects. In some examples, operation 416 may be followed by operation 410.

At operation 410, example process 400 may comprise simulating operation(s) of the active object(s), according to any of the techniques discussed herein. The simulation may comprise simulating motion and/or state(s) of all the objects classified as active objects by operation 406, operation 412, and/or operation 416. Whether all these operations were conducted depends on the various determinations discussed above. In some examples, operation 410 may comprise individually simulating each active object's interaction with the vehicle interaction based at least in part on the active object's object detection data and/or passive prediction data and one or more candidate trajectories determined for controlling the vehicle. In an additional or alternate example, a subset of the active objects may be simulated. In an additional or alternate example, all the active objects may be simulated together with the vehicle so that interactions of the different objects may be simulated. For example, where the computation allocation limit has been met, the scenario simulated by the simulation component may be quite complex since it may account for how each active object's motion and/or state affects all the rest of the active objects and the vehicle and whether its motion and/or state affects the rest of the active objects and the vehicle at all. Regardless, the operation 410 may comprise storing motion and/or states of the active objects over the course of the simulation and outputting a simulated prediction for each active object as a result of the simulation. A simulated prediction for an object may indicate a predicted trajectory and/or predicted state of an object.

The simulated prediction may indicate, for example, an estimated future a position, orientation, velocity (e.g., lateral, longitudinal, rotational, otherwise), acceleration (e.g., lateral, longitudinal, rotational, otherwise), simulated sensor data segmentation, ROI, object state, and/or a confidence score associated with the simulated prediction. In some examples, any of this data may be indicated as a function of time and may accordingly change over time.

At operation 418, example process 400 may comprise controlling the vehicle based at least in part on the simulation, according to any of the techniques discussed herein. In some examples, operation 418 may comprise determining a trajectory with which to control the vehicle based at least in part on the simulated predicted trajectory(ies) determined for any objects classified as active objects and/or any passive predicted trajectories for any remaining inactive objects.

Example Process to Classify an Object as an Active Object Based on a Trajectory Interaction with the Vehicle Using Parallel Processing FIGS. 5A-5D illustrate a pictorial flow diagram of an example process 500 for determining a trajectory-based object importance score for use in classifying objects as active or inactive objects. In some examples, example process 500 may be part of operation 410 and may be executed, at least in part, by the relevance filter 234. In some examples, the relevance filter 234 may be executed on a CPU and may manage and/or interface with one or more GPU or TPU threads or thread blocks. Additionally or alternatively, the relevance filter 234 may entirely be executed on a GPU or TPU.

Figure 5A:
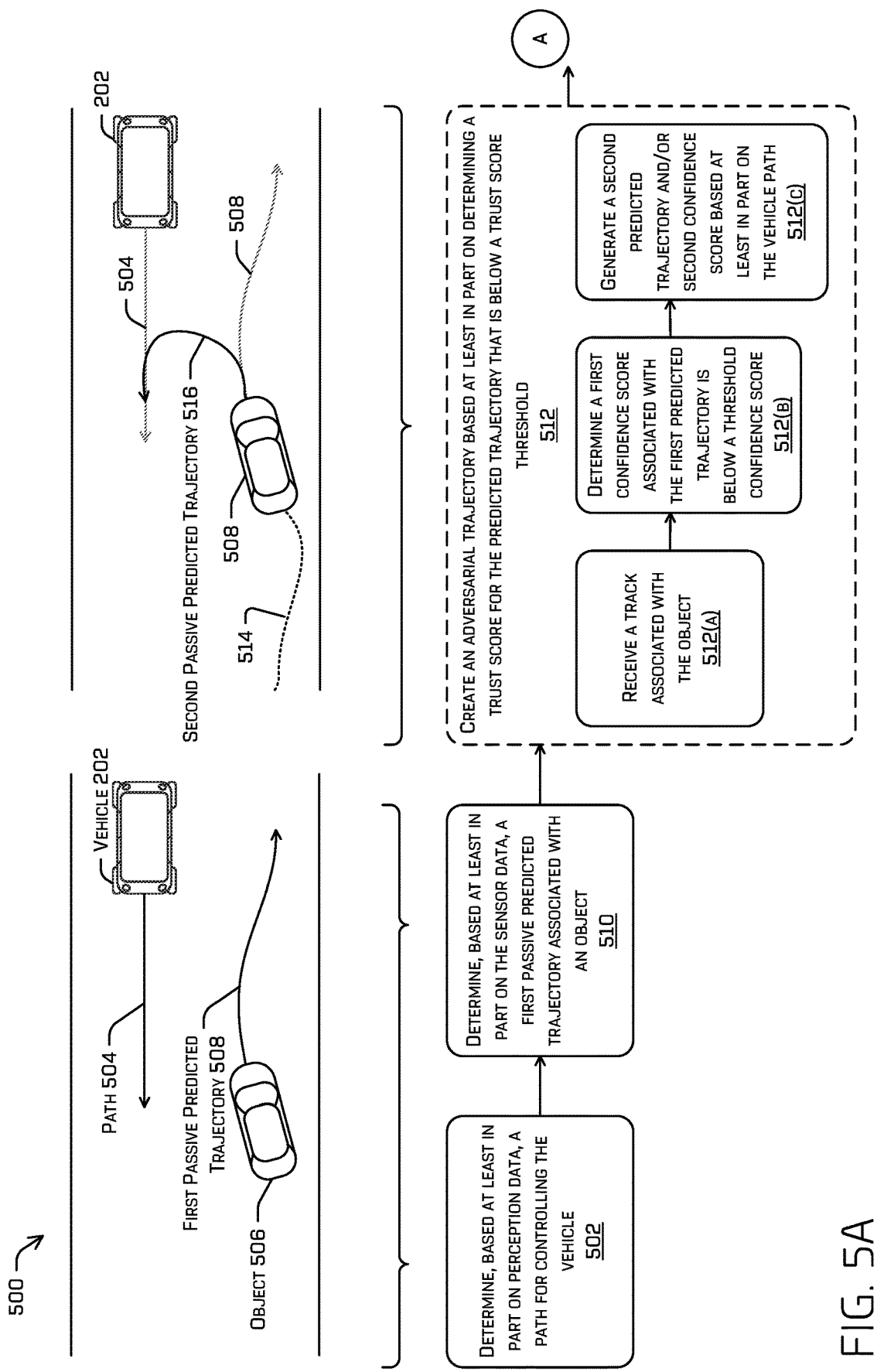
FIGS. 5A-5D illustrate a pictorial flow diagram of an example process for determining trajectory-based object importance scores for use in classifying objects as active or inactive objects.

Turning to FIG. 5A, at operation 502, example process 500 may comprise determining, based at least in part on sensor data, map data, and/or route data, a path 504 for controlling the vehicle 202, according to any of the techniques discussed herein. In some examples, determining the path 504 may be based at least in part on localization data (that may be based on sensor data) that indicates where the vehicle is relative to a map and/or progress along a route. For example, the path may identify lane(s) in which the vehicle may be, turns the vehicle will need to make, etc. to complete a mission. In some examples, the path may identify multiple lane(s) that the planning component of the vehicle 202 will use as part of planning a series of trajectories for controlling the vehicle (where each trajectory in the series is associated with a time step from a current time up to a time horizon). In some examples, the path 504 may be time-invariant, meaning that the path 504 may merely identify position(s) and/or a region without reference to time.

At operation 510, example process 500 may comprise determining, based at least in part on the perception data, a first passive predicted trajectory associated with the object 506, according to any of the techniques discussed herein. Operation 510 may comprise determining the first passive predicted trajectory 508 (also referred to as a preliminary predicted trajectory herein) using a kinematic model that is set up using object detection data associated with the object 506, such as the current and/or historical object position, orientation, velocity, acceleration, or the like. In additional or alternate examples, the first passive predicted trajectory 508 may be simpler and may assume a constant velocity (e.g., longitudinal, lateral, and/or rotational), although any of the characteristics described above may be determined. Additionally or alternatively, the first passive predicted trajectory 508 may be determined by a neural network or transformer that may additionally or alternatively determine a confidence score associated with the first passive predicted trajectory indicating a likelihood that the first passive predicted trajectory 508 is accurate.

At operation 512, example process 500 may comprise creating an adversarial trajectory based at least in part on determining a trust score for the predicted trajectory that is below a trust score threshold, according to any of the techniques discussed herein. In some examples, operation 512 may comprise receiving a track 514 associated with the object at operation 512(*a*). The position portion of a track 514 is indicated as a dotted line in FIG. 5A. In some examples, the track 514 may indicate a series of object detections (or just the movement/object state data thereof) over time from the past until a current time that are all associated with object 506 and/or an amalgamation of data related thereto, such as various averages, moving averages, or the like. Operation 512 may further comprise determining a first trust score associated with the first passive predicted trajectory is below a threshold trust score at operation 512(*b*). In some examples, operation 512(*b*) may include determining the trust score based at least in part on a deviation of the first passive predicted trajectory 508 from the track, an extrapolation of the track, and/or, a current pose (e.g., position and/or orientation) of the object. For example, the trust score may be based at least in part on a difference (e.g., a distance, an average distance) between the predicted trajectory and the extrapolation or the current pose or a normalization of that difference. If this trust score meets or exceeds the threshold trust score, operation 512 may be skipped in some examples, although in other examples, an adversarial trajectory may still be created. Operation 512 may further comprise generating (operation 512(*c*)) a second passive predicted trajectory 516 and/or second confidence score based at least in part on the path 504 associated with vehicle 202.

For example, the second passive/preliminary predicted trajectory 516 (i.e., an adversarial trajectory) may generated such that the object 506 would track from the object's current position, heading, and/or velocity to a position, heading, and/or velocity indicated by the path 504 for controlling the vehicle. In some examples, the second confidence score may be the remainder of the first confidence score associated with the first passive predicted trajectory 508 between the first confidence score and a maximum confidence score. Additionally or alternatively, the second confidence score may be inversely proportional to the first confidence score. Additionally or alternatively, a predetermined confidence score may be assigned as the second confidence score. In such an example, the predetermined confidence score may be very low, e.g., 0.01, 0.05, 0.1 on a scale of 0 to 1 where 1 is a highest confidence score. Creating this adversarial trajectory may ensure that objects that could have a trajectory interaction with the vehicle within a horizon time are accounted for in the simulation or at least that low confidence passive predicted trajectories aren't overly relied upon, which might result in an object failing to be classified as an active object when there's a low trust that the object isn't going to have a trajectory interaction with the vehicle.

Figure 5B:
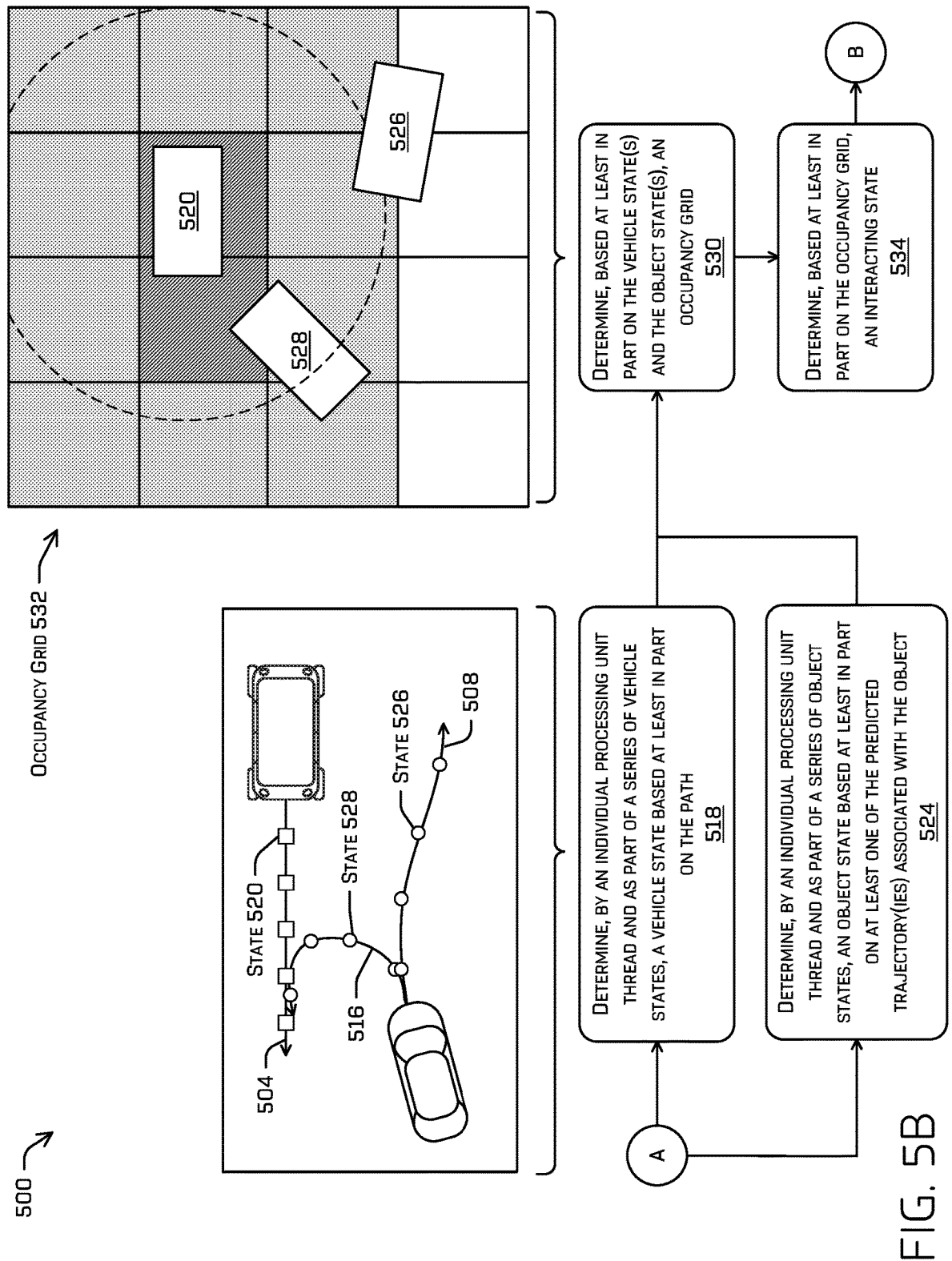

Turning to FIG. 5B, at operation 518, example process 500 may comprise determining, by an individual processing unit thread and as part of a series of vehicle states, a vehicle state based at least in part on the path 504, according to any of the techniques discussed herein. In some examples, the individual processing unit thread may be a CPU, GPU, or TPU thread. Individual and separate processing threads may determine each of the vehicle states of the series of vehicle states as part of parallel processing generation of the series of vehicle states. In some examples, the individual processing threads may be threads of a same thread block of the processing unit. In some examples, the vehicle states may be determined at different arclengths/displacements along the path 504. In some examples, determining the vehicle state may comprise determining a maximum time and/or minimum time at which the vehicle will reach the arclength/displacement, s. The maximum time it may take for the vehicle to arrive at the arclength/displacement may be given by (assuming a minimum acceleration of @min <0, i.e. the maximum acceleration:

$$t_{max} = \begin{cases} \dfrac{\sqrt{v_0^2 + 2a_{min}s} - v_0}{a_{min}} & \text{if } s \leq -\dfrac{v_0^2}{2a_{min}} \\ \infty & \text{otherwise} \end{cases} \quad (1)$$

Where $v_0$ is the vehicle's current speed and s denotes the arclength at the sampled state. The minimum arrival time may be estimated by assuming maximum acceleration is greater than zero, $a_{max} > 0$:

$$t_{min} = \begin{cases} \dfrac{\sqrt{v_0^2 + 2a_{max}s} - v_0}{a_{max}} & \text{if } s \leq -\dfrac{v_0^2}{2a_{min}} \\ \dfrac{v_{max} - v_0}{a_{max}} + \dfrac{s - \bar{s}}{v_{max}} & \text{otherwise} \end{cases} \quad (2)$$

where $$\bar{s} = \frac{v_{max}^2 - v_0^2}{2a_{max}}.$$

A sampled vehicle state may, accordingly, comprise an estimated minimum arrival time at the arclength/displacement, estimated latest arrival time at the arclength/displacement, position, and orientation of the vehicle. The number of vehicle states in the series may depend on the total arclength/displacement of the path, which may vary. For example, if the vehicle is stopping or near stopping, the number of sampled vehicle states may be low (e.g., 2 or 3) whereas if the vehicle is moving quickly, the number of sampled vehicle states may be higher (e.g., 4, 5, 6, or more). FIG. 5B depicts sampled vehicle states as squares and include vehicle state 520.

At operation 524, example process 500 may comprise determining, by an individual processing unit thread and as part of a series of object states, an object state based at least in part on at least one of the predicted trajectory(ies) associated with the object, according to any of the techniques discussed herein. In some examples, multiple predicted trajectories may be determined for the object, such as one or more passive predicted trajectory(ies) and/or an adversarial predicted trajectory. In some examples, the individual processing unit thread may be a CPU, GPU, or TPU thread. Individual and separate processing threads may determine each of the object states of the series of object states as part of parallel processing generation of the series of object states. In some examples, the individual processing threads may be threads of a same thread block of the processing unit. In some examples, the object states may be determined at different times along the predicted trajectory(ies) determined for the object. An individual processing unit thread may determine an object state along a predicted trajectory according to a time interval along the predicted trajectory up to a horizon time. For example, a first individual processing unit thread may determine a first object state associated with a first time in the future that is at a first time space at a time interval from a current time, a second individual and separate processing unit thread may determine a second object state associated with a second time in the future that is a time interval from the first time, and so on up to a time horizon. For example, if the time horizon is 8 seconds into the future and the time interval is 0.5 seconds, 16 individual processing unit threads may each determine one of 16 object states in the object state series. An object state may comprise an estimated minimum arrival time at a time, estimated latest arrival time at the time, position, and orientation of the object. Since the times are known but the prediction may not be perfect, the minimum and maximum estimated arrival times may be determined based at least in part on a buffer time that may be based at least in part on a prediction error, a confidence score associated with the predicted trajectory being sampled (e.g., lower confidence score would result in an increased time buffer amount), and/or a heuristic amount of time. For example, the estimated soonest time of arrival of the object for a sampled time, t, may be given by:

$$t_{min} = t - \Delta t \quad (3)$$

and the estimated latest time of arrival of the object for a sampled time, t, may be given by:

$$t_{max} = t + \Delta t \quad (4)$$

where $\Delta t$ is the time buffer to account for prediction uncertainty.

Sampled object states are depicted as circles in FIG. 5B and include a first series of object states for the first passive predicted trajectory 508, including object state 526, and a second series of object states for the second passive predicted trajectory 516, including object state 528. Again, the number of object states in a series of object states sampled from a predicted trajectory associated with an object depend on the prediction time horizon and the time interval.

At operation 530, example process 500 may comprise determining, based at least in part on the vehicle state(s) and the object state(s), an occupancy grid 532, according to any of the techniques discussed herein. Generating the occupancy grid may comprise dividing an area associated with the environment into cells, which may be associated with sub-portions of the environment. For example, a single cell may be associated with a 2×2 meter, 4×4 meter, or any other area of the environment. In some examples, operation 530 may use the position from an object state and vehicle and an ROI associated with each to populate the occupancy grid. For example, for each object state and vehicle state may be used to indicate whether an occupancy grid cell will be occupied by either or both of the vehicle or the object and, for the object occupancy, may indicate which predicted trajectory would result in the object occupying a particular cell.

The occupancy grid may further use the vehicle states to indicate interacting cells and relevant cells. Interacting cells may be cells that the vehicle would occupy according to the sampled vehicle state(s) and relevant cells may be cells that are within a threshold distance of a position that the vehicle would occupy according to a vehicle state. For example, occupancy grid 532 depicts interacting cells in dark grey, the threshold distance as a dotted line, and relevant cells as light gray.

At operation 534, example process 500 may comprise determining, based at least in part on the occupancy grid, an interacting state, according to any of the techniques discussed herein. Operation 534 may comprise determining a sampled object state that indicates that the position and/or an ROI associated with the object state would occupy a cell indicated as being an interacting cell as determined at operation 530. Object states that indicate positions outside the relevant cells or interacting cells may be indicated as irrelevant (e.g., by assigning a null score, e.g., 0, or excluding them from further computation) and may not be further processed. In some examples, operation 534 may be accomplished by individual processing unit threads.

Figure 5C:
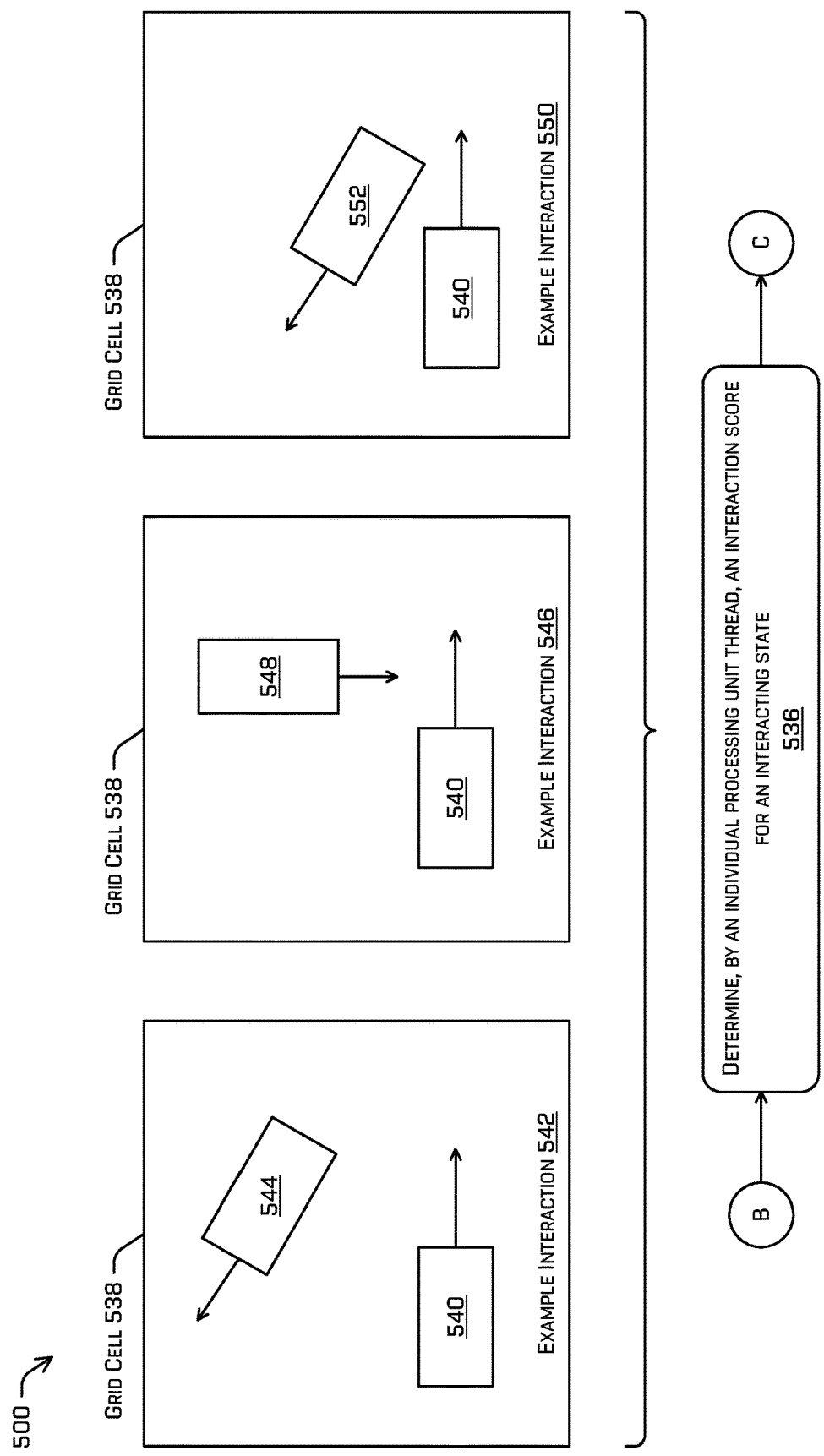

Turning to FIG. 5C, at operation 536, example process 500 may comprise determining, by an individual processing unit thread, an interaction score for an interaction state, according to any of the techniques discussed herein. An interaction state may include a state where a vehicle state and object state may have been determined to be interacted by virtue of an object position and/or ROI occupying an interacting cell as determined at operation 530 and operation 534. The operation 536 may determine an interaction score for an object state based at least in part on a position and/or orientation indicated by the object state relative to a position and/or orientation indicated by the vehicle state that the object state is determined to interact with, i.e., by virtue of occupying a same grid cell 538 as the position indicated by a vehicle state 540.

In a first example interaction 542, the interaction score determined may be 0 because the object pose 544 (i.e., position and orientation) indicated by the object state is at a distance from the vehicle position indicated by the vehicle state 540 that is greater than a threshold distance and the orientation of the object and the vehicle do not conflict. Determining whether two orientations conflict may comprise extrapolating the orientation and determining whether the extrapolations intersect or nearly intersect (i.e., come within a second threshold distance of each other).

In a second example interaction 546, the object state 548 and the vehicle state 540 interact, which may be determined based at least in part on determining that the orientations of the vehicle and the object conflict. Determining that the orientations conflict may comprise extrapolating the orientation and determining whether the extrapolations intersect or nearly intersect (i.e., come within a second threshold distance of each other). An interaction score may be determined for this interaction according to the interaction score function discussed below.

In a third example interaction 550, the object state 552 and the vehicle state 540 interact, which may be determined based at least in part on determining that the position indicated by the object state 552 is a distance from the position indicated by the vehicle state 540 that is less than a threshold distance. An interaction score may be determined for this interaction according to the interaction score function discussed below even though the orientations of the vehicle and the object do not conflict.

For those interactions where the object position is within a threshold distance of the vehicle position and/or the object orientation conflicts with the vehicle orientation, the relevance filter may determine an interaction score, otherwise, the interaction score may be zero. The interaction score may be determined by the following function:

$$r = \exp(-\alpha(t_{o,min} + t_{k,min})) \qquad (5)$$

where $\alpha$ is a constant weight, $t_k$ is the k-th object state and time interval, and the score increases as the interaction occurs sooner, since alpha is multiplied by the minimum occupancy time—this allows interactions that happen later in time to be prioritized less than interactions that may happen sooner.

Figure 5D:
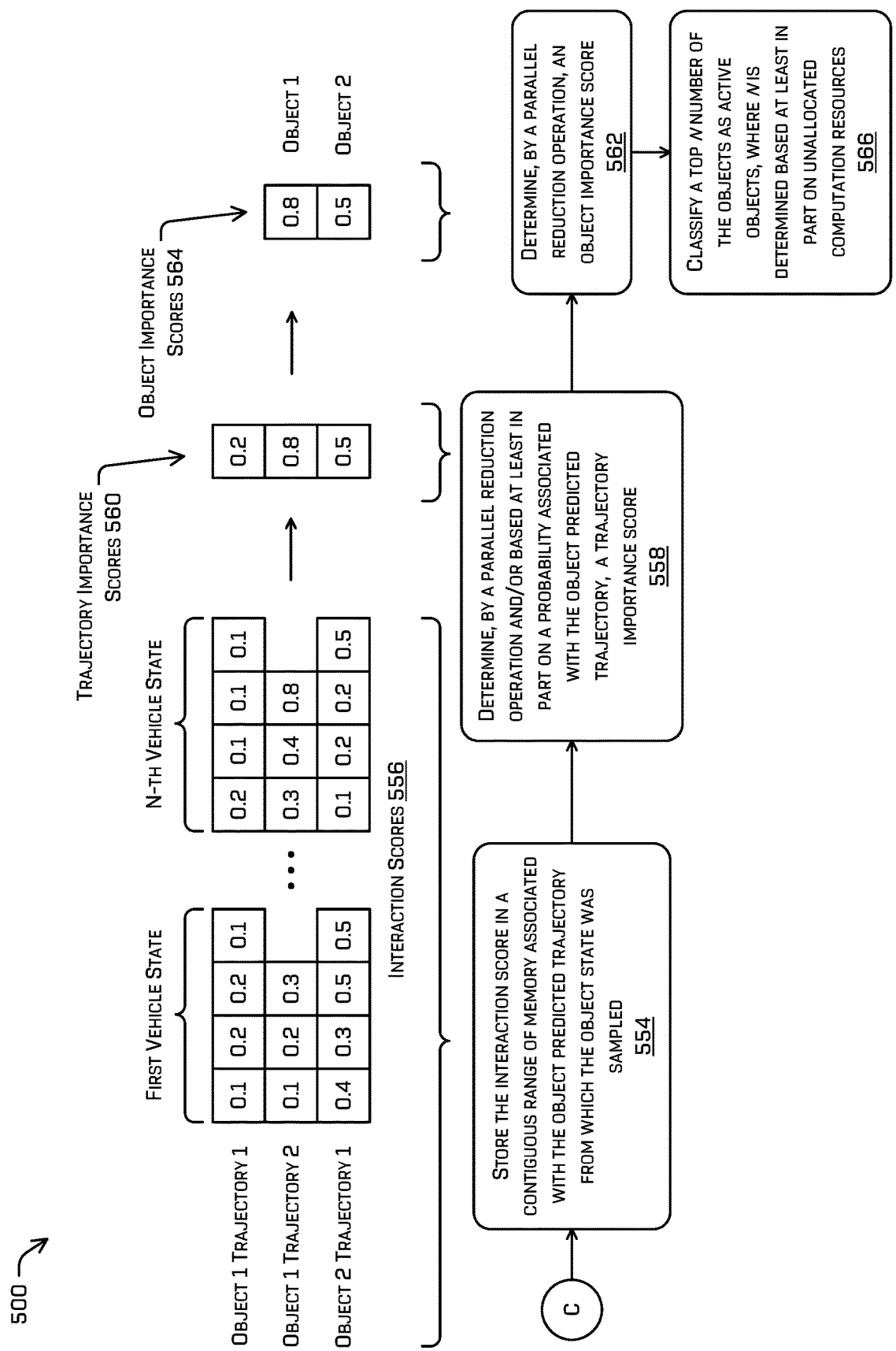

Turning to FIG. 5D, at operation 554, example process 500 may comprise storing the interaction score in a contiguous range of memory associated with the object predicted trajectory from which the object state was sampled, according to any of the techniques discussed herein. For example, interaction scores 556 may be determined for sequential object states and respective vehicle states with which they interact in sequential portions of memory to form a range of memory that includes the object state-vehicle state interaction scores for a particular predicted trajectory. For example, FIG. 5D depicts a first range of memory for a first object and a first predicted trajectory in a top row, a second range of memory for the first object and a second predicted trajectory a middle row, and a third range of memory for a second object and a first predicted trajectory for the second object in a bottom row. The respective vehicle state for which an interaction score of the object state is being determined may be indicated by placement in a column (e.g., sequential unit of memory in the range or a sub-range of the memory, such as depicted in FIG. 5D). Each square represents a single element of memory that may store an interaction score, represented as numbers between 0 and 1. In some examples, an additional portion of the memory may identify which element of the memory is associated with which cell, object, and trajectory.

Further, an object state may interact with multiple vehicle states, as reflected by the fact that the rows include object state-vehicle state interaction components for a first through an n-th vehicle state. In the depicted example, there may be four object states sampled from the object trajectories, which may be the result of a prediction time horizon of 4 seconds and sampling object states at 1 second intervals. Since the number of vehicle states sampled varies as a function of arc length/displacement and since not every object state may interact with a vehicle state, the number of memory elements in a memory range associated with a particular trajectory may be variable. In some examples, the same individual processing unit thread that determined the interaction score at operation 536 may store the interaction score in the contiguous range of memory in coordination with the other individual processing threads determining interaction score (s) for other object state-vehicle state interactions for the same object trajectory. Note that the number of object states of a particular object trajectory that interact with a vehicle state may not be the same between different object trajectories. Hence, the object 1 trajectory 2 is depicted as having three interaction scores for three object states that interact with a vehicle state, whereas object 1 trajectory 1 and object 2 trajectory 1 each have four. Note that more or less interaction scores may be determined based on the number of a trajectory's object states that are determined to be interacting with the vehicle.

At operation 558, example process 500 may comprise determining, by a parallel reduction operation and/or based at least in part on a probability associated with the predicted trajectory, a trajectory importance score 560, according to any of the techniques discussed herein. In some examples, the parallel reduction operation may comprise using a first thread to determine an operation on two memory elements of a memory range and using first results of that operation to conduct a further operation on second results from a second thread conducting an operation on two further memory elements of the same memory range. This may be repeated until all the elements in the memory range have been operated on. The operation may comprise summing the interaction scores in the memory range or determining a maximum interaction score in the memory range. This parallel storage and processing technique may reduce compute and latency for determining the object importance scores. Once the memory ranges for all the object(s) and their trajectory(ies) have each been reduced via parallel reduction to a value, that value may be multiplied by the confidence score associated with the trajectory to determine the trajectory importance score. The depicted parallel reduction operation may determine a maximum in the respective memory ranges, resulting in the values "0.2", "0.8", and "0.5". Although FIG. 5D does not depict multiplying these values by the confidence score, which would potentially result in a different value for each trajectory importance score, to facilitate understanding of the parallel reduction results.

At operation 562, example process 500 may comprise determining, by a second parallel reduction operation, an object importance score 564, according to any of the techniques discussed herein. The second parallel reduction may parallel reduce elements of a memory range associated with a same object. Whereas the first parallel reduction parallel reduced elements of a same trajectory associated with one object, the second parallel reduction parallel reduces elements of all trajectories associated with one object. In some examples, the second parallel reduction may comprise adding the trajectory importance scores, which with the multiplication of the parallel reduced elements of the interaction scores 556 would be a weighted sum of the trajectory importance scores 560 for that object, which could be divided by the number of predicted trajectories determined to interact with the object to determine a weighted average object importance score for the object. Additionally or alternatively, the parallel reduction of operation 562 may comprise determining a maximum value from the memory range associated with an object.

In some examples, the trajectory that resulted in the object importance score may be identified in association with the object score. For example, the object importance score for object 1 in FIG. 5D resulted from object 1 trajectory 2. Accordingly, object 1 trajectory 2 may be identified as the trajectory that resulted in the object score "0.8" for object 1.

Note that, in an additional or alternate example, object detection(s) of certain object classification(s) (e.g., pedestrian, active public service object) may be assigned an object importance score and may be included in the classification determination at operation 566. However, the object importance score assigned to active public service objects may be assigned a fixed value instead of using the object importance score determination operations of example process 500. The fixed value may, instead, be the maximum importance score, such as 1, plus some heuristic value (e.g., 0.01, any other number since the maximum importance score needs only be increased by a marginal amount to ensure the active public service object(s) are classified as active object(s)).

At operation 566, example process 500 may comprise classifying a top n number of objects as active objects, according to greatest object importance score, according to any of the techniques discussed herein. For example, n may be based at least in part on unallocated computation resources, such that should n objects be classified as active objects and allocated computation resources would not cause the computation allocation limit to be exceeded. Objects that do not have sufficiently high object importance scores to fall into the top n objects by object importance score may be classified as inactive objects.

Any object(s) classified as being active objects at operation 566 may be simulated at operation 410 so that simulated predicted trajectory(ies) for those object(s) may be used as part of controlling the vehicle at operation 418. In some examples, simulating an active predicted trajectory for an object classified as an active object according to example process 500 may comprise providing to a simulation component/tree search cell(s) identifying location(s) and/or region(s) of the environment determined from the trajectory that resulted in the object importance score at operation 562. This may comprise providing a top q number of interacting cells and/or relevant cells (as ranked by interaction score) to the simulation component/tree search as input or providing all the interacting cells and/or relevant cells to the simulation component/tree search. In such an example, the simulation component may predict, using a machine-learned model, a likelihood of the object occupying one of the cells it was provided based at least in part on a candidate action for controlling the vehicle 202, passive predicted trajectory(ies) of inactive object(s) in the environment, and/or other active predicted trajectory(ies). The tree search may then use a set of these likelihoods (associated with the trajectory that resulted in the object importance score that in turn resulted in the object being classified as an active object) to determine a cost associated with a candidate action. For example, determining the cost may comprise determining a sub-cost that is based at least in part on a likelihood associated with a cell, where the sub-cost may be used as part of the total cost, such as by summing other sub-costs and/or determining a weighted sum of the sub-costs.

Some of the other sub-costs may include, for example, a sub-cost that is based at least in part on safety, passenger comfort, progress along a route, drive dynamics (e.g., feasibility of the candidate action, risk of wheel slippage), and/or sub-cost(s) associated with passive predicted trajectory(ies). In some examples, since a passive predicted trajectory may be more inaccurate than an active predicted trajectory, the tree search may add noise to the passive predicted trajectory, resulting in a likelihood distribution over a region generated from the passive predicted trajectory that may be used to determine a sub-cost for the passive predicted trajectory. Such a sub-cost may be determined based at least in part on a whether the candidate action would result in the vehicle 202 occupying space within the region generated from the passive predicted trajectory using the noise and/or likelihood(s) associated with the portion(s) of the region that the vehicle would occupy as a result of implementing the candidate action.

Figure 6:
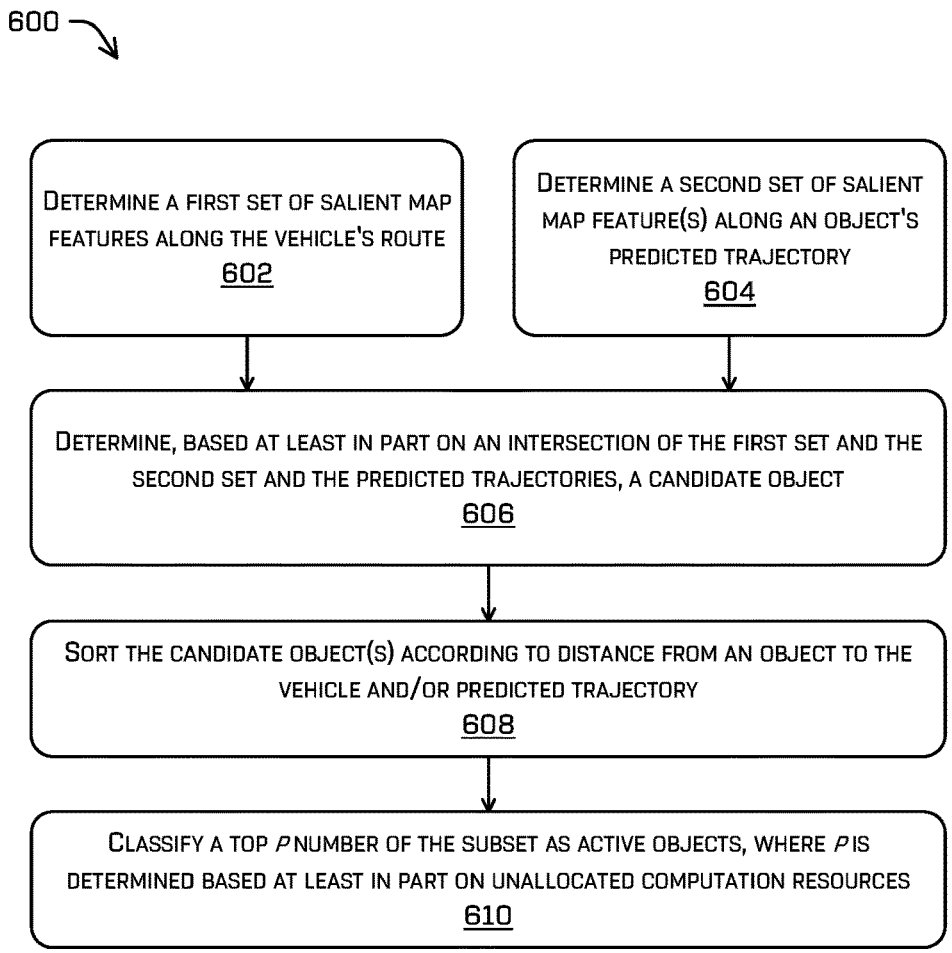
FIG. 6 illustrates a flow diagram of an example process for determining an object that may be classified as being an active object based on a right-of-way interaction determination process.

Example Process for Classifying an Object as an Active Object Based on a Right-of-Way Interaction with the Vehicle FIG. 6 illustrates a flow diagram of an example process 600 for determining to classify an object as an active object based on the object having a right-of-way interaction with the vehicle. In some examples, example process 600 may be part of operation 416 and may be executed, at least in part, by the relevance filter 234. In some examples, the relevance filter 234 may be executed on a CPU and may manage and/or interface with one or more CPU, GPU, or TPU threads or thread blocks. Additionally or alternatively, the relevance filter 234 may entirely be executed on a GPU or TPU.

At operation 602, example process 600 may comprise determining a first set of salient map features along the vehicle's route, according to any of the techniques discussed herein. In some examples, operation 602 may comprise retrieving map data and receiving a route for the vehicle. The route may define a path from a current position of the vehicle to an end point, such as a mission end point such as picking up or dropping off a passenger, or an intermediate mission end point, such as reaching the end of a block, entering a highway, or the like. Operation 602 may comprise determining whether a directionality of the path indicates that the vehicle will approach a salient feature within a threshold time or distance. Salient features may be identified by a rule set that identifies portions of map data as being salient. For example, the rule set may identify crosswalks, junctions, and the like as salient features. Additionally or alternatively, operation 602 may be based at least in part on perception data, such as a pedestrian or cyclist object detection, and a portion of roadway near a pedestrian or cyclist may be indicated as being a salient map feature. Additionally or alternatively, some map features may only be indicated as being salient map features if an object detection indicating a particular object classification is detected. For example, a crosswalk may, in some examples, only be indicated as a salient map feature if a pedestrian is detected, or a roadway portion may only be indicated as being a salient feature if a cyclist is detected and no barrier exists between the cyclist and the roadway portion.

At operation 604, example process 600 may comprise determining a second set of salient map features along an object's predicted trajectory, according to any of the techniques discussed herein. Operation 604 may be similar to operation 602 but may use an object's passive predicted trajectory to determine whether an object is approaching a salient map feature.

At operation 606, example process 600 may comprise determining, based at least in part on an intersection of the first set and the second set and the predicted trajectory, a candidate object, according to any of the techniques discussed herein. Operation 606 may comprise determining whether any map feature(s) in the first set (being approached by the vehicle) are the same as map feature(s) in the second set (being approached by the object). If so, the object may be identified as a candidate object that may have a right-of-way interaction with the vehicle. If no such intersection between the first set and the second set exists, the object may be classified as an inactive object.

At operation 608, example process 600 may comprise sorting any candidate objects identified at operation 606 according to distance from the object to the vehicle and/or according to the object's predicted trajectory, according to any of the techniques discussed herein. In some examples, the predicted trajectory and/or a rule set codifying rules of the road may function as a filter at operation 608. For example, operation 608 may comprise determining whether the predicted trajectory associated with an object indicates that the object is departing the salient map feature. In that case, the object may be classified as an inactive object. However, if an extrapolation of the predicted trajectory associated with the object would conflict with an extrapolation of a trajectory of the vehicle or if rules of the road would allow the object to take a trajectory that would conflict with a trajectory of the vehicle (such as by turning in front of the vehicle), the object may be indicated has having a right-of-way interaction with the vehicle. Any such object may then be sorted by distance from the vehicle as a candidate for classification as an active object at operation 610. Additionally or alternatively, instead of a rule-based system as described, a weighted score could be used to determine those object(s) that have a right-of-way interaction with the vehicle. For example, a score function may determine a weighted score that assigns a first weight to rules of the road, a second weight to distance to the vehicle, a third weight to trajectory interaction with the vehicle, and/or a fourth weight to a current and/or predicted trajectory of the object.

Figure 7A:
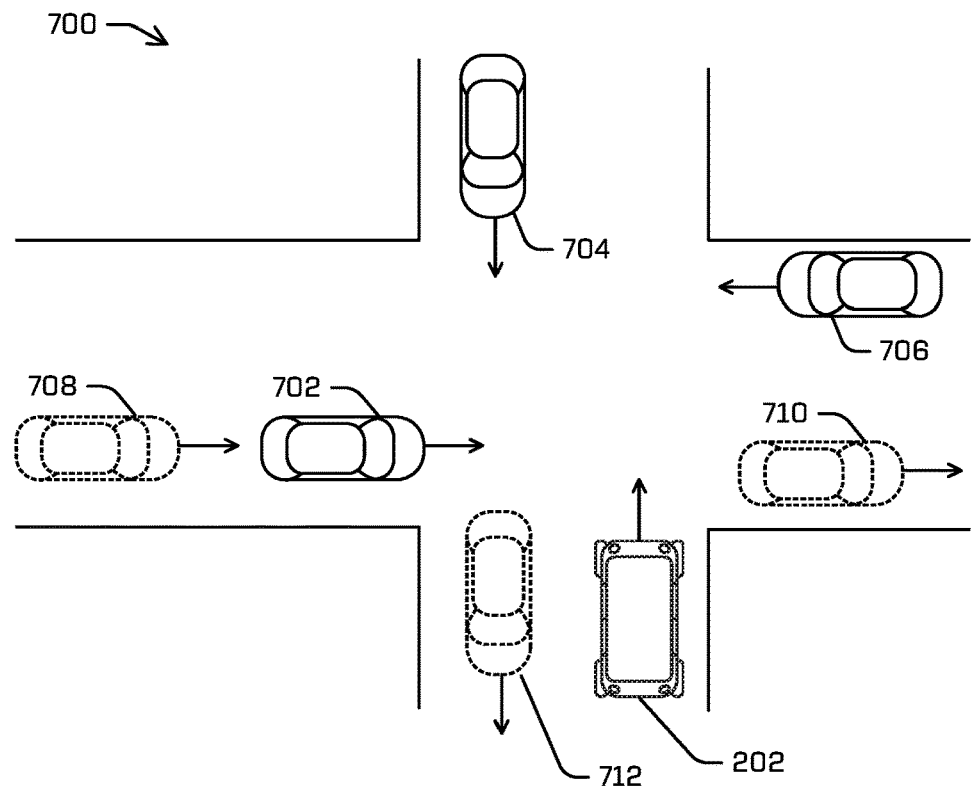
FIGS. 7A and 7B illustrate example scenario illustrating how the example process of FIG. 6 may be used to classify objects as active or inactive objects using a right-of-way interaction determination.
Figure 7B:
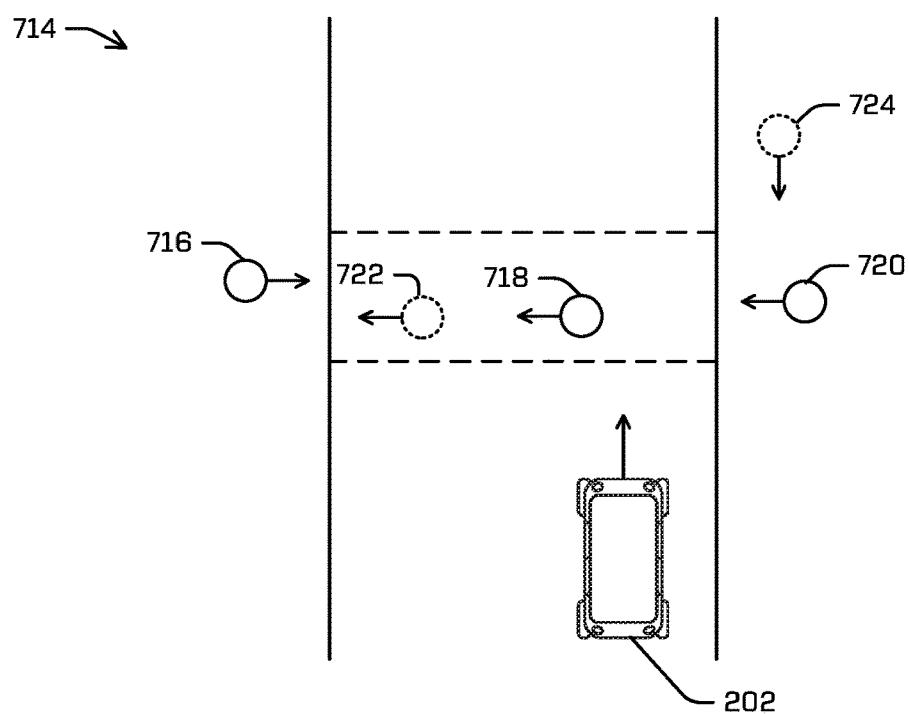

At operation 610, example process 600 may comprise classifying a top p number of objects that have a right-of-way interaction with the vehicle as active objects, according to closest distance to the vehicle, according to any of the techniques discussed herein. For example, p may be based at least in part on unallocated computation resources, such that should p objects be classified as active objects and allocated computation resources would not cause the computation allocation limit to be exceeded. Additionally or alternatively, where a weighted score is determined at operation 608, operation 610 may determine a top p number of objects by greatest score. Objects that are not sufficiently close to the vehicle to fall into the top p objects by distance to the vehicle may be classified as inactive objects. Any object(s) classified as being active objects at operation 566 may be simulated at operation 410 so that simulated predicted trajectory(ies) for those object(s) may be used as part of controlling the vehicle at operation 418. FIGS. 7A and 7B further indicate how this process may classify objects as active and inactive objects.

Example Scenarios Including Both Right-of-Way Interacting and Non-Right-of-Way Interacting Objects FIGS. 7A and 7B illustrate example scenario illustrating how the example process of FIG. 6 may be used to classify objects as active or inactive objects using a right-of-way interaction determination.

FIG. 7A illustrates a first scenario 700 where the vehicle 202 is approaching a four-way controlled intersection, which may be an example of a salient map feature. According to the example process 600, object 702, object 704, and object 706 may be classified as active objects, if enough unallocated computation resources exist due to these objects (1) having predicted trajectories that would interact with a trajectory of the vehicle 202 (e.g., via extrapolation of those trajectories), as is the case for object 702 and object 706 or being permitted by a rule of the road to make a maneuver that would result in a trajectory that interacts with the vehicle, as is the case with object 704, which could turn in front of the vehicle 202. Moreover, (2) object 702, object 704, and object 706 may be at a distance from the vehicle 202 within a top p number of objects according to distance from the vehicle 202. Object 708 would have a trajectory that interacts with a trajectory of the vehicle 202, but a rule of the road prevents such an interaction (the object 708 cannot run into object 702) and/or the object 708 may be just far enough from the vehicle 202 to not be within the top p number of objects ranked by distanced to the vehicle 202. Object 710 and object 712 are departing the salient map feature, i.e., the intersection, and may accordingly be classified as inactive objects. Additionally or alternatively, object 710 and object 712 each have predicted trajectories associated therewith that do not interact with the trajectory of the vehicle 202 and may be additionally or alternatively classified as inactive objects for this determination.

FIG. 7B illustrates a second scenario 714 where the vehicle 202 is approaching a crosswalk, indicated in dashed lines, which may be a salient map feature. According to the example process 600, object 716, object 718, and object 720 may be classified as active objects, if enough unallocated computation resources exist due to these objects (1) having predicted trajectories that would interact with a trajectory of the vehicle 202 (e.g., via extrapolation of those trajectories), as is the case for object 716 and object 720 or being permitted by a rule of the road to make a maneuver that would result in a trajectory that interacts with the vehicle, as is the case with object 718, which could turn around and go other way. Moreover, (2) object 716, object 718, and object 720 may be at a distance from the vehicle 202 within a top p number of objects according to distance from the vehicle 202. Object 722 could be permitted by a rule of the road to have a trajectory that interacts with a trajectory of the vehicle 202, but a weighted score determined based at least in part on the rules of the road, the current and/or predicted trajectory of the object, distance to the vehicle, and trajectory interaction may result in the object 722 being in the top p objects by score. Object 724 is may or may not be determined to be approaching the salient map feature, but regardless object 724 is not associated with a predicted trajectory that interacts with a trajectory of the vehicle 202. Accordingly object 722 and object 724 may be classified as inactive objects.

In additional or alternate examples, an object may additionally or alternatively be indicated as being an active object in the right-of-way determination based at least in part on an object classification identified by the object detection, such as more sensitive object classifications, such as pedestrians and cyclists. For example, objects may be ranked according to a combination of distance to the vehicle 202 and object classification.

Example Clauses

A. A system comprising: one or more processors; and one or more non-transitory memory storing processor-executable instructions that, when executed by the one or more processors, cause the system to perform operations comprising: detecting an object proximate a vehicle traversing an environment; determining a set of vehicle states associated with a path for controlling the vehicle; determining a set of object states associated with a predicted trajectory of the object; determining a set of interaction scores based at least in part on the set of vehicle states and the set of object states; determining, based at least in part on the set of interaction scores, a trajectory importance score associated with the predicted trajectory; determining, based at least in part on the trajectory importance score, an object importance score associated with the object; and controlling the vehicle based at least in part on the object importance score.

B. The system of paragraph A, wherein the predicted trajectory is a preliminary predicted trajectory and controlling the vehicle based at least in part on the object importance score comprises one of: determining, based at least in part on the object importance score being greater than or equal to a threshold object importance score, a second predicted trajectory using a machine learned model based at least in part on object detection data associated with the object and a candidate action for controlling the vehicle, wherein controlling the vehicle is based at least in part on the second predicted trajectory; or determining that the object importance score is less than or equal to a threshold, wherein: controlling the vehicle is based at least in part on the preliminary predicted trajectory, and the preliminary predicted trajectory is determined by a kinematic model.

C. The system of either paragraph A or B, wherein: a first processing unit thread determines a first interaction score of the set of interaction scores and stores the first interaction score in a first range of memory associated with interactions scores determined for the object and the predicted trajectory; and a second processing unit thread determines a second interaction score of the set of interaction scores and stores the second interaction score in the first range of memory.

D. The system of paragraph C, wherein a row of memory elements is associated with a single trajectory for the object and columns associated with the row are associated with different vehicle states.

E. The system of any one of paragraphs A-D, wherein: determining a first vehicle state of the set of vehicle states comprises determining, based at least in part on at least one of a speed or acceleration of the vehicle, a minimum time and a maximum time that the vehicle will reach a first location along the path; and determining a first object state of the set of object state comprises determining, based at least in part on a buffer time, a soonest time of arrival at a second location along the predicted trajectory and a latest time of arrival at the second location.

F. The system of any one of paragraphs A-E, wherein: determining the trajectory importance score is based at least in part on a first parallel reduction by separate threads of a processing unit of the set of object states; and determining the object importance score is based at least in part on a second parallel reduction by separate thresholds of the processing unit of the trajectory importance score and at least a second trajectory importance score associated with a second predicted trajectory determined for the object.

G. One or more non-transitory computer-readable media storing processor-executable instructions that, when executed by one or more processors, cause one or more processors to perform operations comprising: detecting an object proximate a vehicle traversing an environment; determining a set of vehicle states associated with a path for controlling the vehicle; determining a set of object states associated with a predicted trajectory of the object; determining a set of interaction scores based at least in part on the set of vehicle states and the set of object states; determining, based at least in part on the set of interaction scores, a trajectory importance score associated with the predicted trajectory; determining, based at least in part on the trajectory importance score, an object importance score associated with the object; and controlling the vehicle based at least in part on the object importance score.

H. The one or more non-transitory computer-readable media of paragraph G, wherein the predicted trajectory is a preliminary predicted trajectory and controlling the vehicle based at least in part on the object importance score comprises one of: determining, based at least in part on the object importance score being greater than or equal to a threshold object importance score, a second predicted trajectory using a machine learned model based at least in part on object detection data associated with the object and a candidate action for controlling the vehicle, wherein controlling the vehicle is based at least in part on the second predicted trajectory; or determining that the object importance score is less than or equal to a threshold, wherein: controlling the vehicle is based at least in part on the preliminary predicted trajectory, and the preliminary predicted trajectory is determined by a kinematic model.

I. The one or more non-transitory computer-readable media of paragraph H, wherein controlling the vehicle comprises determining the second predicted trajectory and determining the second predicted trajectory comprises: determining a set of locations in the environment associated with interaction scores that meet or exceed a threshold interaction score; and determining, by a machine-learned model and based at least in part on a candidate action for controlling the vehicle, a set of likelihoods associated with set of locations, wherein a first likelihood of the set of likelihoods indicates a likelihood the object will occupy a first location of the set of locations.

J. The non-transitory computer-readable media of any one of paragraphs G-I, wherein: a first processing unit thread determines a first interaction score of the set of interaction scores and stores the first interaction score in a first range of memory associated with interactions scores determined for the object and the predicted trajectory; and a second processing unit thread determines a second interaction score of the set of interaction scores and stores the second interaction score in the first range of memory.

K. The one or more non-transitory computer-readable media of paragraph J, wherein a row of memory elements is associated with a single trajectory for the object and columns associated with the row are associated with different vehicle states.

L. The one or more non-transitory computer-readable media of any one of paragraphs G-K, wherein: determining a first vehicle state of the set of vehicle states comprises determining, based at least in part on at least one of a speed or acceleration of the vehicle, a minimum time and a maximum time that the vehicle will reach a first location along the path; and determining a first object state of the set of object state comprises determining, based at least in part on a buffer time, a soonest time of arrival at a second location along the predicted trajectory and a latest time of arrival at the second location.

M. The one or more non-transitory computer-readable media of any one of paragraphs G-L, wherein: determining the trajectory importance score is based at least in part on a first parallel reduction by separate threads of a processing unit of the set of object states; and determining the object importance score is based at least in part on a second parallel reduction by separate thresholds of the processing unit of the trajectory importance score and at least a second trajectory importance score associated with a second predicted trajectory determined for the object.

N. A method comprising: detecting an object proximate a vehicle traversing an environment; determining a set of vehicle states associated with a path for controlling the vehicle; determining a set of object states associated with a predicted trajectory of the object; determining a set of interaction scores based at least in part on the set of vehicle states and the set of object states; determining, based at least in part on the set of interaction scores, a trajectory importance score associated with the predicted trajectory; determining, based at least in part on the trajectory importance score, an object importance score associated with the object; and controlling the vehicle based at least in part on the object importance score.

O. The method of paragraph N, wherein the predicted trajectory is a preliminary predicted trajectory and controlling the vehicle based at least in part on the object importance score comprises one of: determining, based at least in part on the object importance score being greater than or equal to a threshold object importance score, a second predicted trajectory using a machine learned model based at least in part on object detection data associated with the object and a candidate action for controlling the vehicle, wherein controlling the vehicle is based at least in part on the second predicted trajectory; or determining that the object importance score is less than or equal to a threshold, wherein: controlling the vehicle is based at least in part on the preliminary predicted trajectory, and the preliminary predicted trajectory is determined by a kinematic model.

P. The method of paragraph O, wherein controlling the vehicle comprises determining the second predicted trajectory and determining the second predicted trajectory comprises: determining a set of locations in the environment associated with interaction scores that meet or exceed a threshold interaction score; and determining, by a machine-learned model and based at least in part on a candidate action for controlling the vehicle, a set of likelihoods associated with set of locations, wherein a first likelihood of the set of likelihoods indicates a likelihood the object will occupy a first location of the set of locations.

Q. The method of any one of paragraphs N-P, wherein: a first processing unit thread determines a first interaction score of the set of interaction scores and stores the first interaction score in a first range of memory associated with interactions scores determined for the object and the predicted trajectory; and a second processing unit thread determines a second interaction score of the set of interaction scores and stores the second interaction score in the first range of memory.

R. The method of paragraph Q, wherein a row of memory elements is associated with a single trajectory for the object and columns associated with the row are associated with different vehicle states.

S. The method of any one of paragraphs N-R, wherein: determining a first vehicle state of the set of vehicle states comprises determining, based at least in part on at least one of a speed or acceleration of the vehicle, a minimum time and a maximum time that the vehicle will reach a first location along the path; and determining a first object state of the set of object state comprises determining, based at least in part on a buffer time, a soonest time of arrival at a second location along the predicted trajectory and a latest time of arrival at the second location.

T. The method of any one of paragraphs N-S, wherein: determining the trajectory importance score is based at least in part on a first parallel reduction by separate threads of a processing unit of the set of object states; and determining the object importance score is based at least in part on a second parallel reduction by separate thresholds of the processing unit of the trajectory importance score and at least a second trajectory importance score associated with a second predicted trajectory determined for the object.

U. A system comprising: one or more processors; and one or more non-transitory memory storing processor-executable instructions that, when executed by the one or more processors, cause the system to perform operations comprising: detecting a set of objects proximate a vehicle traversing an environment; classifying a first subset of the objects as active objects; determining, by a machine-learned model and based at least in part on a candidate action for controlling the vehicle, a set of predicted trajectories for the first subset; classifying a second subset of the objects as inactive objects, wherein the second subset of the objects is a remainder of the set of objects not classified as active objects; and controlling the vehicle based at least in part on the set of predicted trajectories and a set of preliminary predicted trajectories that is generated for the second subset of objects.

V. The system of paragraph U, wherein classifying the first subset of the objects as active objects is based at least in part on an amount of available computational resources and classifying a first object of the set of objects as an active object is based at least in part on one or more of: an object classification associated with the first object of the first subset; a right-of-way of the first object; or a first object importance score determined for the first object meeting or exceeding an object score threshold or being in a top n number of objects ranked according to object importance score.

W. The system of paragraph V, wherein classifying the first object as an active object comprises: determining the object classification of the first object based at least in part on sensor data; and determining, based at least in part on the object classification comprising a defined classification, to associate the object with a maximum importance score plus a predetermined value.

X. The system of any one of paragraphs U-W, wherein classifying a first object of the set of objects as an active object comprises: determining a set of vehicle states associated with a path for controlling the vehicle; determining a set of object states associated with a preliminary predicted trajectory of the first object; determining a set of interaction scores based at least in part on the set of vehicle states and the set of object states; determining, based at least in part on the set of interaction scores, a trajectory importance score associated with the preliminary predicted trajectory; and determining, based at least in part on the trajectory importance score, an object importance score associated with the first object.

Y. The system of paragraph X, wherein the operations further comprise: receiving a track associated with the first object, the track identifying at least one of a historical position, orientation, velocity, or acceleration of the first object; determining that a first trust score associated with the preliminary predicted trajectory is below a threshold trust score, wherein the first trust score is determined based at least in part on the preliminary predicted trajectory and the track and wherein the first trust score indicates an accuracy of the preliminary predicted trajectory; and determining to generate a second preliminary predicted trajectory for the object based at least in part on determining that the first trust score is below the threshold trust score, wherein the second preliminary predicted trajectory is determined based at least in part on the path for controlling the vehicle.

Z. The system of any one of paragraphs U-Y, wherein the set of preliminary trajectories are determined by a kinematic model based at least in part on sensor data associated with the second subset of objects.

AA. One or more non-transitory computer-readable media storing processor-executable instructions that, when executed by one or more processors, cause one or more processors to perform operations comprising: detecting a set of objects proximate a vehicle traversing an environment; classifying a first subset of the objects as active objects; determining, by a machine-learned model and based at least in part on a candidate action for controlling the vehicle, a set of predicted trajectories for the first subset; classifying a second subset of the objects as inactive objects, wherein the second subset of the objects is a remainder of the set of objects not classified as active objects; and controlling the vehicle based at least in part on the set of predicted trajectories and a set of preliminary predicted trajectories that is generated for the second subset of objects.

AB. The one or more non-transitory computer-readable media of paragraph AA, wherein classifying the first subset of the objects as active objects is based at least in part on an amount of available computational resources and classifying a first object of the set of objects as an active object is based at least in part on one or more of: an object classification associated with the first object of the first subset; a right-of-way of the first object; or a first object importance score determined for the first object meeting or exceeding an object score threshold or being in a top n number of objects ranked according to object importance score.

AC. The one or more non-transitory computer-readable media of paragraph AB, wherein determining the right-of-way of the first object comprises: determining a map feature associated with the first object; and determining at least one of: that the first object is at least one of approaching or oriented towards the map feature; the object classification associated with the object; or a distance from the first object to at least one of the vehicle or the map feature.

AD. The one or more non-transitory computer-readable media of either paragraph AB or AC, wherein classifying the first object as an active object comprises: determining the object classification of the first object based at least in part on sensor data; and determining, based at least in part on the object classification comprising a defined classification, to associate the object with a maximum importance score plus a predetermined value.

AE. The one or more non-transitory computer-readable media of any one of paragraphs AA-AD, wherein classifying a first object of the set of objects as an active object comprises: determining a set of vehicle states associated with a path for controlling the vehicle; determining a set of object states associated with a preliminary predicted trajectory of the first object; determining a set of interaction scores based at least in part on the set of vehicle states and the set of object states; determining, based at least in part on the set of interaction scores, a trajectory importance score associated with the preliminary predicted trajectory; and determining, based at least in part on the trajectory importance score, an object importance score associated with the first object.

AF. The one or more non-transitory computer-readable media of paragraph AE, wherein the operations further comprise: receiving a track associated with the first object, the track identifying at least one of a historical position, orientation, velocity, or acceleration of the first object; determining that a first trust score associated with the preliminary predicted trajectory is below a threshold trust score, wherein the first trust score is determined based at least in part on the preliminary predicted trajectory and the track and wherein the first trust score indicates an accuracy of the preliminary predicted trajectory; and determining to generate a second preliminary predicted trajectory for the object based at least in part on determining that the first trust score is below the threshold trust score, wherein the second preliminary predicted trajectory is determined based at least in part on the path for controlling the vehicle.

AG. The one or more non-transitory computer-readable media of any one of paragraphs AA-AF, wherein the set of preliminary trajectories are determined by a kinematic model based at least in part on sensor data associated with the second subset of objects.

AH. A method comprising: detecting a set of objects proximate a vehicle traversing an environment; classifying a first subset of the objects as active objects; determining, by a machine-learned model and based at least in part on a candidate action for controlling the vehicle, a set of predicted trajectories for the first subset; classifying a second subset of the objects as inactive objects, wherein the second subset of the objects is a remainder of the set of objects not classified as active objects; and controlling the vehicle based at least in part on the set of predicted trajectories and a set of preliminary predicted trajectories that is generated for the second subset of objects.

AI. The method of paragraph AH, wherein classifying the first subset of the objects as active objects is based at least in part on an amount of available computational resources and classifying a first object of the set of objects as an active object is based at least in part on one or more of: an object classification associated with the first object of the first subset; a right-of-way of the first object; or a first object importance score determined for the first object meeting or exceeding an object score threshold or being in a top n number of objects ranked according to object importance score.

AJ. The method of paragraph AI, wherein determining the right-of-way of the first object comprises: determining a map feature associated with the first object; and determining at least one of: that the first object is at least one of approaching or oriented towards the map feature; the object classification associated with the object; or a distance from the first object to at least one of the vehicle or the map feature.

AK. The method of either paragraph AI or AJ, wherein classifying the first object as an active object comprises: determining the object classification of the first object based at least in part on sensor data; and determining, based at least in part on the object classification comprising a defined classification, to associate the object with a maximum importance score plus a predetermined value.

AL. The method of any one of paragraphs AH-AK, wherein classifying a first object of the set of objects as an active object comprises: determining a set of vehicle states associated with a path for controlling the vehicle; determining a set of object states associated with a preliminary predicted trajectory of the first object; determining a set of interaction scores based at least in part on the set of vehicle states and the set of object states; determining, based at least in part on the set of interaction scores, a trajectory importance score associated with the preliminary predicted trajectory; and determining, based at least in part on the trajectory importance score, an object importance score associated with the first object.

AM. The method of paragraph AL, wherein the method further comprises: receiving a track associated with the first object, the track identifying at least one of a historical position, orientation, velocity, or acceleration of the first object; determining that a first trust score associated with the preliminary predicted trajectory is below a threshold trust score, wherein the first trust score is determined based at least in part on the preliminary predicted trajectory and the track and wherein the first trust score indicates an accuracy of the preliminary predicted trajectory; and determining to generate a second preliminary predicted trajectory for the object based at least in part on determining that the first trust score is below the threshold trust score, wherein the second preliminary predicted trajectory is determined based at least in part on the path for controlling the vehicle.

AN. The method of any one of paragraphs AH-AM, wherein the set of preliminary trajectories are determined by a kinematic model based at least in part on sensor data associated with the second subset of objects.

AO. The method of paragraph AM, wherein the trust score indicates a likelihood that the preliminary predicted trajectory is accurate and is based at least in part on a deviation of at least a portion of the preliminary predicted trajectory from at least one of: a current orientation of the first object; or an extrapolation of at least one of the track or the current position, orientation, velocity, or acceleration of the first object.

While the example clauses described above are described with respect to one particular implementation, it should be understood that, in the context of this document, the content of the example clauses can also be implemented via a method, device, system, computer-readable medium, and/or another implementation. Additionally, any of examples A-AO may be implemented alone or in combination with any other one or more of the examples A-AO.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory memory storing processor-executable instructions that, when executed by the one or more processors, cause the system to perform operations comprising:
detecting an object proximate a vehicle traversing an environment;
determining a set of vehicle states associated with a path for controlling the vehicle;
determining a set of object states associated with a predicted trajectory of the object;
determining a set of interaction scores based at least in part on the set of vehicle states and the set of object states;
determining, based at least in part on the set of interaction scores and a first parallel reduction by separate threads of a processing unit of the set of object states, a trajectory importance score associated with the predicted trajectory;
determining, based at least in part on the trajectory importance score and a second parallel reduction by the separate threads of the processing unit of the trajectory importance score, an object importance score associated with the object; and
controlling the vehicle based at least in part on the object importance score.

2. The system of claim 1, wherein the predicted trajectory is a preliminary predicted trajectory and controlling the vehicle based at least in part on the object importance score comprises one of:
determining, based at least in part on the object importance score being greater than or equal to a threshold object importance score, a second predicted trajectory using a machine learned model based at least in part on object detection data associated with the object and a candidate action for controlling the vehicle,
wherein controlling the vehicle is based at least in part on the second predicted trajectory; or
determining that the object importance score is less than or equal to a threshold, wherein:
controlling the vehicle is based at least in part on the preliminary predicted trajectory, and
the preliminary predicted trajectory is determined by a kinematic model.

3. The system of claim 1, wherein:
a first processing unit thread determines a first interaction score of the set of interaction scores and stores the first interaction score in a first range of memory associated with interactions scores determined for the object and the predicted trajectory; and
a second processing unit thread determines a second interaction score of the set of interaction scores and stores the second interaction score in the first range of memory.

4. The system of claim 3, wherein a row of memory elements is associated with a single trajectory for the object and columns associated with the row are associated with different vehicle states.

5. The system of claim 1, wherein:
determining a first vehicle state of the set of vehicle states comprises determining, based at least in part on at least one of a speed or acceleration of the vehicle, a minimum time and a maximum time that the vehicle will reach a first location along the path; and
determining a first object state of the set of object states comprises determining, based at least in part on a buffer time, a soonest time of arrival at a second location along the predicted trajectory and a latest time of arrival at the second location.

6. The system of claim 1, wherein:
determining the object importance score is based at least in part on a second trajectory importance score associated with a second predicted trajectory determined for the object.

7. One or more non-transitory computer-readable media storing processor-executable instructions that, when executed by one or more processors, cause the one or more processors to perform operations comprising:
detecting an object proximate a vehicle traversing an environment;
determining a set of vehicle states associated with a path for controlling the vehicle;
determining a set of object states associated with a predicted trajectory of the object;
determining a set of interaction scores based at least in part on the set of vehicle states and the set of object states;
determining, based at least in part on the set of interaction scores and a first parallel reduction by separate threads of a processing unit of the set of object states, a trajectory importance score associated with the predicted trajectory;
determining, based at least in part on the trajectory importance score and a second parallel reduction by the separate threads of the processing unit of the trajectory importance score, an object importance score associated with the object; and
controlling the vehicle based at least in part on the object importance score.

8. The one or more non-transitory computer-readable media of claim 7, wherein the predicted trajectory is a preliminary predicted trajectory and controlling the vehicle based at least in part on the object importance score comprises one of:
determining, based at least in part on the object importance score being greater than or equal to a threshold object importance score, a second predicted trajectory using a machine learned model based at least in part on object detection data associated with the object and a candidate action for controlling the vehicle,
wherein controlling the vehicle is based at least in part on the second predicted trajectory; or
determining that the object importance score is less than or equal to a threshold, wherein:
controlling the vehicle is based at least in part on the preliminary predicted trajectory, and
the preliminary predicted trajectory is determined by a kinematic model.

9. The one or more non-transitory computer-readable media of claim 8, wherein controlling the vehicle comprises determining the second predicted trajectory and determining the second predicted trajectory comprises:
determining a set of locations in the environment associated with interaction scores that meet or exceed a threshold interaction score; and
determining, by a machine-learned model and based at least in part on the candidate action for controlling the vehicle, a set of likelihoods associated with the set of locations, wherein a first likelihood of the set of likelihoods indicates a likelihood the object will occupy a first location of the set of locations.

10. The one or more non-transitory computer-readable media of claim 7, wherein:
a first processing unit thread determines a first interaction score of the set of interaction scores and stores the first interaction score in a first range of memory associated with interactions scores determined for the object and the predicted trajectory; and
a second processing unit thread determines a second interaction score of the set of interaction scores and stores the second interaction score in the first range of memory.

11. The one or more non-transitory computer-readable media of claim 10, wherein a row of memory elements is associated with a single trajectory for the object and columns associated with the row are associated with different vehicle states.

12. The one or more non-transitory computer-readable media of claim 7, wherein:
determining a first vehicle state of the set of vehicle states comprises determining, based at least in part on at least one of a speed or acceleration of the vehicle, a minimum time and a maximum time that the vehicle will reach a first location along the path; and
determining a first object state of the set of object states comprises determining, based at least in part on a buffer time, a soonest time of arrival at a second location along the predicted trajectory and a latest time of arrival at the second location.

13. The one or more non-transitory computer-readable media of claim 7, wherein:
determining the object importance score is based at least in part on a second trajectory importance score associated with a second predicted trajectory determined for the object.

14. A method comprising:
detecting an object proximate a vehicle traversing an environment;
determining a set of vehicle states associated with a path for controlling the vehicle;
determining a set of object states associated with a predicted trajectory of the object;
determining a set of interaction scores based at least in part on the set of vehicle states and the set of object states;
determining, based at least in part on the set of interaction scores and a first parallel reduction by separate threads of a processing unit of the set of object states, a trajectory importance score associated with the predicted trajectory;
determining, based at least in part on the trajectory importance score and a second parallel reduction by the separate threads of the processing unit of the trajectory importance score, an object importance score associated with the object; and
controlling the vehicle based at least in part on the object importance score.

15. The method of claim 14, wherein the predicted trajectory is a preliminary predicted trajectory and controlling the vehicle based at least in part on the object importance score comprises one of:
determining, based at least in part on the object importance score being greater than or equal to a threshold object importance score, a second predicted trajectory using a machine learned model based at least in part on object detection data associated with the object and a candidate action for controlling the vehicle,
wherein controlling the vehicle is based at least in part on the second predicted trajectory; or
determining that the object importance score is less than or equal to a threshold, wherein:
controlling the vehicle is based at least in part on the preliminary predicted trajectory, and
the preliminary predicted trajectory is determined by a kinematic model.

16. The method of claim 15, wherein controlling the vehicle comprises determining the second predicted trajectory and determining the second predicted trajectory comprises:
determining a set of locations in the environment associated with interaction scores that meet or exceed a threshold interaction score; and
determining, by a machine-learned model and based at least in part on the candidate action for controlling the vehicle, a set of likelihoods associated with the set of locations, wherein a first likelihood of the set of likelihoods indicates a likelihood the object will occupy a first location of the set of locations.

17. The method of claim 14, wherein:
a first processing unit thread determines a first interaction score of the set of interaction scores and stores the first interaction score in a first range of memory associated with interactions scores determined for the object and the predicted trajectory; and
a second processing unit thread determines a second interaction score of the set of interaction scores and stores the second interaction score in the first range of memory.

18. The method of claim 17, wherein a row of memory elements is associated with a single trajectory for the object and columns associated with the row are associated with different vehicle states.

19. The method of claim 14, wherein:
determining a first vehicle state of the set of vehicle states comprises determining, based at least in part on at least one of a speed or acceleration of the vehicle, a minimum time and a maximum time that the vehicle will reach a first location along the path; and
determining a first object state of the set of object states comprises determining, based at least in part on a buffer time, a soonest time of arrival at a second location along the predicted trajectory and a latest time of arrival at the second location.

20. The method of claim 14, wherein:
determining the object importance score is based at least in part on a second trajectory importance score associated with a second predicted trajectory determined for the object.

* * * * *